US011654992B2

(12) United States Patent
Perreten et al.

(10) Patent No.: US 11,654,992 B2
(45) Date of Patent: May 23, 2023

(54) MOLDABLE BICYCLE SADDLES, EXTERNAL SADDLE HEATERS, FITTING PROCEDURES, AND RELATED TECHNOLOGIES

(71) Applicant: Versal Manufacturing, Inc., Vancouver (CA)

(72) Inventors: Michael Perreten, North Vancouver (CA); Aaron Brown, Delta (CA); Dylan Schuetze, Vancouver (CA); Thomas Edstrand, North Vancouver (CA)

(73) Assignee: Reform Technologies Inc., Vancouver (CA)

( * ) Notice: Subject to any disclaimer, the term of this patent is extended or adjusted under 35 U.S.C. 154(b) by 0 days.

(21) Appl. No.: 17/499,642

(22) Filed: Oct. 12, 2021

(65) Prior Publication Data

US 2022/0161880 A1    May 26, 2022

Related U.S. Application Data

(63) Continuation of application No. 17/006,716, filed on Aug. 28, 2020, now Pat. No. 11,173,974, which is a continuation-in-part of application No. 16/518,757, filed on Jul. 22, 2019, now abandoned, which is a continuation of application No. 16/358,600, filed on Mar. 19, 2019, now Pat. No. 10,399,626, which is a continuation of application No. PCT/IB2018/001482, filed on Sep. 17, 2018.

(60) Provisional application No. 62/894,597, filed on Aug. 30, 2019, provisional application No. 62/560,095, filed on Sep. 18, 2017.

(51) Int. Cl.
*B62J 1/00* (2006.01)
*B62J 1/10* (2006.01)

(52) U.S. Cl.
CPC .................. *B62J 1/10* (2013.01); *B62J 1/007* (2013.01)

(58) Field of Classification Search
CPC ........... B62J 1/10; B62J 1/007; A47D 15/006; A47D 15/00; A47D 13/06; F16H 1/28
See application file for complete search history.

(56) References Cited

U.S. PATENT DOCUMENTS

| 3,997,214 A | 12/1976 | Jacobs |
| 4,615,856 A | 10/1986 | Silverman |
| 5,348,369 A | 9/1994 | Yu |

(Continued)

FOREIGN PATENT DOCUMENTS

| DE | 3625210 A1 | 2/1988 |
| EP | 1862382 A1 | 12/2007 |

(Continued)

OTHER PUBLICATIONS

International Search Report and Written Opinion for International Application No. PCTIB2018/001482; dated Apr. 15, 2019; 14 pages.

*Primary Examiner* — Timothy J Brindley
(74) *Attorney, Agent, or Firm* — Perkins Coie LLP

(57) ABSTRACT

A bicycle saddle can be customized to a rider's body to achieve desired support and comfort. The support shell is configured to support a rider's body and can be heated by an external heater and/or at least one internal thermal element operable to heat the bicycle saddle such that the saddle is molded to the rider.

22 Claims, 18 Drawing Sheets

(56) References Cited

U.S. PATENT DOCUMENTS

| | | |
|---|---|---|
| 6,066,277 A | 5/2000 | Lee |
| 6,990,744 B2 | 1/2006 | Bieganek et al. |
| 8,308,234 B2 | 11/2012 | Segato |
| D718,543 S | 12/2014 | Smith et al. |
| 8,973,986 B1 | 3/2015 | Marceleno |
| 9,039,082 B2 | 5/2015 | Truglio |
| D753,926 S | 4/2016 | Smith et al. |
| 9,446,808 B2 | 9/2016 | Marui |
| 10,124,535 B2 | 11/2018 | Yu |
| 10,399,626 B2 | 9/2019 | Perreten et al. |
| 10,722,166 B2* | 7/2020 | Bigolin ................ A61B 5/1116 |
| 11,173,974 B2 | 11/2021 | Perreten et al. |
| 2003/0167557 A1 | 9/2003 | Lashoto et al. |
| 2004/0232742 A1 | 11/2004 | Oehler |
| 2005/0025953 A1 | 2/2005 | Hetzel et al. |
| 2005/0075046 A1 | 4/2005 | Williams |
| 2005/0121951 A1 | 6/2005 | Yu |
| 2008/0018147 A1 | 1/2008 | Ybarrola |
| 2008/0093898 A1 | 4/2008 | Chiang |
| 2008/0201828 A1 | 8/2008 | Kanavage |
| 2015/0298752 A1 | 10/2015 | Tseng et al. |
| 2018/0244332 A1* | 8/2018 | Krause ...................... B62J 1/00 |
| 2019/0210678 A1* | 7/2019 | Perreten ................... B62J 1/10 |
| 2020/0114998 A1 | 4/2020 | Perreten et al. |

FOREIGN PATENT DOCUMENTS

| | | |
|---|---|---|
| WO | 2009093124 A1 | 7/2009 |
| WO | 2017035645 A1 | 3/2017 |
| WO | 2019058183 A3 | 6/2019 |

\* cited by examiner

MOLDABLE BICYCLE SADDLES, EXTERNAL SADDLE HEATERS, FITTING PROCEDURES, AND RELATED TECHNOLOGIES

CROSS REFERENCE TO RELATED APPLICATIONS

This application is a continuation of U.S. patent application Ser. No. 17/006,716, filed Aug. 28, 2020, entitled "MOLDABLE BICYCLE SADDLES, EXTERNAL SADDLE HEATERS, FITTING PROCEDURES, AND RELATED TECHNOLOGIES, (now U.S. Pat. No. 11,173,974), which claims the benefit of U.S. Provisional Patent Application No. 62/894,597, filed Aug. 30, 2019, entitled "EXTERNAL HEATERS FOR MOLDABLE BICYCLE SADDLES, FITTING PROCEDURES, AND RELATED TECHNOLOGIES," and U.S. patent application Ser. No. 17/006,716 is a continuation-in-part of U.S. patent application Ser. No. 16/518,757, filed Jul. 22, 2019, entitled "MOLDABLE BICYCLE SADDLES, FITTING PROCEDURES, AND RELATED TECHNOLOGIES," which is a continuation of U.S. patent application Ser. No. 16/358,600, filed Mar. 19, 2019, entitled "MOLDABLE BICYCLE SADDLES, FITTING PROCEDURES, AND RELATED TECHNOLOGIES," (now U.S. Pat. No. 10,399,626), which is a continuation of International Application No. PCT/IB2018/001482, filed Sep. 17, 2018, entitled "MOLDABLE BICYCLE SADDLES, FITTING PROCEDURES, AND RELATED TECHNOLOGIES," which claims the benefit of U.S. Provisional Patent Application No. 62/560,095, filed Sep. 17, 2017, entitled MOLDABLE BICYCLE SADDLES AND FITTING PROCEDURES FOR THE SAME," all of which applications are incorporated by reference herein in their entireties.

TECHNICAL FIELD

The present invention relates generally to the field of heaters, moldable bicycle saddles, and fitting procedures. In particular, the present disclosure relates to customizable bicycle saddles, heaters for heating moldable seats, and fitting procedures.

BACKGROUND

Bicycles are used throughout the world for recreation, exercise, and transportation. Conventional bicycle saddles may not comfortably support a rider's sit bones, which can lead to discomfort and pain. Conventional bicycle saddles may also not be well suited for many riders because anatomies often vary greatly. Additionally, if the rider's weight or size changes significantly, a saddle may become uncomfortable, requiring installation of a new saddle.

DETAILED DESCRIPTION

Overview

Figure 1:
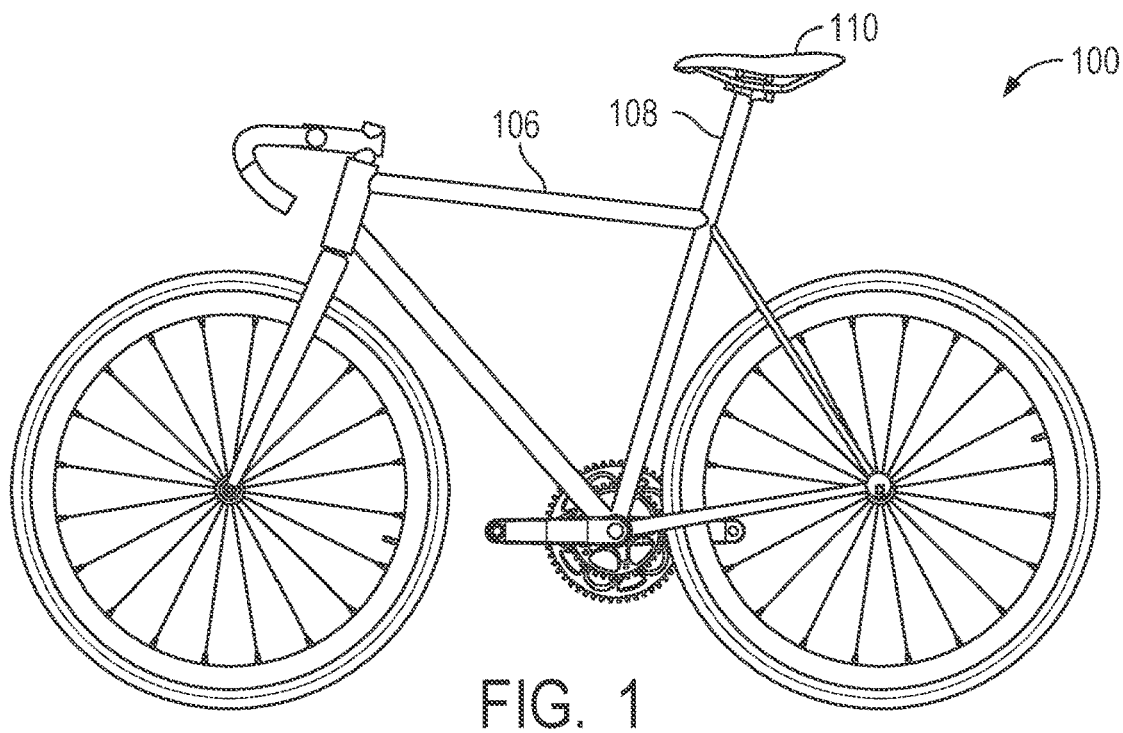
FIG. 1 is a side view of a bicycle with a customized bicycle saddle in accordance with an embodiment of the technology.

In some embodiments, a customizable bicycle saddle can have a thermoformable material moldable to conform to the user's anatomy to achieve a desired level of comfort, performance, and/or body position. The saddle can be molded multiple times to achieve a desired customized fit. The saddle can be heated using a heater that is integrated into the saddle or an external heater (e.g., an external heater assembly) that can be temporarily mounted to the saddle. In integrated heater embodiments, the heater can be embedded underneath padding such that the rider cannot feel the heater during normal use. In external heater embodiments, the heater can be temporarily installed underneath the saddle to thermally contact thermoformable material of the saddle. The external heater can be removed after completing a thermoforming process. This can reduce the overall weight of the saddle and allow reuse of the heater to thermoform additional saddles.

The heaters can include addressable thermal elements operable to heat different regions of the saddle. By selectively molding specific regions of a saddle, a highly customized fit can be achieved. For example, if one region of the saddle provides a desired fit, that region can remain at a low temperature (e.g., at or near room temperature) while another region of the saddle that does not provide a desired fit is thermoformed. Additionally, feedback from sensors can be used to control the thermoforming process. The sensors can be temperature sensors, pressure sensors, or other sensors suitable for providing signals indicative of support provided by the saddle. In some embodiments, the heater can have selectively addressable regions each independently operable to provide localized heating. Each region can be controlled based on output, readings, etc. from the sensors at that region.

The bicycle saddle can have a support shell and a padding or cushioning member covering the support shell. The cushioning member can serve as an insulator that limits or inhibits heat transfer from the internal heaters to the rider. This allows the upper surface of bicycle saddle to remain at a sufficiently low temperature to inhibit or prevent discomfort or burning of the rider. For example, the upper surface of the saddle can be kept at or below a first temperature (e.g., 40° C., 41° C., 42° C., 43° C., 44° C., 45° C., or 46° C.) while a moldable element of the support shell is at a molding temperature (e.g., 50° C., 60° C., 70° C., or 80° C.). The moldable element can be made, in whole or in part, of a thermoplastic material. In other embodiments, the moldable element can be made, in whole or in part, of the thermoset material. The support shell can have a rigid base shell that not plastically deformed during the molding process. In various heating procedures, the saddle can be preheated by the heaters. After the rider sits on the saddle, the heaters can periodically or continuously heat the saddle. The internal or external heaters can be controlled based, at least in part, on data collected while the rider sits on the saddle. The heater can be communicatively coupled to a controller and/or power source that controls the thermoforming process.

In some embodiments, a heater assembly for heating a customizable bicycle saddle includes a deployable body and a heater carried by the deployable body. The heater assembly is configured to be removably coupled to the bicycle saddle such that the heater assembly is in thermal contact with at least one thermoformable region of the bicycle saddle. The heater heats the thermoformable region to mold the bicycle saddle to the rider's anatomy while the rider sits on the bicycle saddle.

The heater assembly can be installed between the saddles and rails to which the saddle is mounted. The heater assembly can be moved to an expanded configuration to limit, inhibit, or substantially prevent movement of the heater assembly relative to the saddle. When installed, the heater assembly can be positioned to be in thermal contact with the thermoformable regions of the saddle.

The heater assembly can include one or more thermal elements operable to heat all of the thermoformable regions or selected thermoformable regions (e.g., thermoformable regions to which pressures are applied). The thermoformable regions can be heated to a predetermined temperature, such as a softening temperature, a glass transition temperature, or a melt temperature. The thermal elements can be addressable to provide for selective heating of specific thermoformable regions. In some embodiments, the addressable thermal elements are positioned to heat respective sections of thermoformable region(s) of the bicycle saddle. The region(s) can retain their molded shape when at room temperature and be remolded when heated above a predetermined temperature.

The deployable body can be capable of being inflated while being positioned between the saddle and the rails to which the saddle is mounted. As the deployable body is inflated (e.g., inflated to a pressure of about 5-10 psi), it can push against the bottom of the saddle and upper portions of the rails to achieve a relatively snug fit within the limited space underneath the saddle. The deployable body can have relief features that accommodate bolts, mounting brackets, or other components located proximate to the saddle-bicycle interface. This allows the heater assembly to be installed and used without adjusting the seat installation and/or set up. After thermoforming the bicycle saddle, the deployable body can be deflated to allow convenient removal of the heater assembly from the saddle without unmounting the saddle from the bike. Advantageously, the heater assembly can be removed while the rider continues to sit on the saddle and the thermoformable material cools.

In some embodiments, a method for fitting a bicycle saddle includes coupling an external heater assembly to the bicycle saddle. Thermoformable material of the bicycle saddle can be heated using the heater assembly. A rider can be supported by the bicycle saddle to thermoform the heated material to the rider's body. The thermoformed material can be cooled. The saddle fit can be evaluated to determine whether the desired support is achieved. Any number of thermoforming processes can be performed. After achieving the desired fit, the external heater can be removed from the bicycle saddle.

Seat pressure data can be collected to evaluate the thermoforming process. Pre-molded seat pressure can be obtained to evaluate an initial or pre-molded fit. Post-molded seat pressure can be obtained to evaluate the post-molded fit. The pre-molded seat pressure and the post-molded seat pressure can be compared to determine whether the saddle provides the desired support. The data can be collected using one or more sensors embedded within the bicycle saddle, external sensors applied to the upper surface of the saddle, or sensors at other locations suitable for providing feedback indicative of saddle fit.

In some further embodiments, a method for fitting a bicycle saddle includes heating the bicycle saddle using a heater assembly. The heated bicycle saddle is molded by the rider's body. After molding is completed, the heater assembly is separated from the bicycle saddle. In some fitting sessions, the heater assembly is removed while the rider sits on the warmed bicycle saddle.

The method can include determining whether to remold the bicycle saddle based on one or more sensor measurements, rider feedback, visual inspection, performance data (e.g., rider performance data), etc. The determination can be made based on a controller module (e.g., a computer, a controller, etc.) receiving data from a monitoring system installed on the bicycle saddle. The monitoring system can include internal sensors, external sensors, or other components associated with a saddle. In some embodiments, a technician can evaluate the rider's feedback and determine whether to remold the bicycle saddle.

In some embodiments, an external heater heats a customizable bicycle saddle that includes a support shell configured to support a rider's body. The external heater is capable of heating the support shell to mold the support shell to a rider's anatomy. The heater can heat discrete regions of the support shell that are subjected to relatively high applied pressures. For example, thermal elements of the heater can be positioned to heat regions of the support shell that support the rider's sit bones to a predetermined temperature equal to or greater than a softening temperature, a glass transition temperature, or a melt temperature of those regions. In some embodiments, the thermal elements can heat most of or the entire support shell.

A rider can use the saddle without being able to detect the heater because the heater can be positioned underneath the shell. When the heater is turned on, it can generate a sufficient amount of thermal energy for molding the thermoformable panels. Any number of thermoforming processes can be performed to achieve a desired fit. The saddle can be allowed to cool to the ambient temperature (e.g., room temperature) to set the shape of the saddle. The molding process can be performed any number of times to achieve the desired fit. The heater can be removed and used to perform a molding procedure on other bicycle saddles. This allows the saddles to be kept at a relatively low weight and reduces the likelihood of damage to the reusable heater.

In some embodiments, a bicycle saddle includes a plurality of receiving features and one or more thermoformable panels overlaying the receiving features of a base shell. The panels can be customized to the rider's body. For example, each panel can be positioned directly underneath one of the user's sit bones while the rider uses the saddle. The panels can be molded when heated above a predetermined temperature that can be at least 10° C., 20° C., 30° C., or 40° C. above room temperature, so the panels maintain their molded shape when used in normal environments. A heater can selectively heat the panels.

The saddle can be molded to achieve a desired reduction in the highest rider applied pressure, typically underneath the rider's sit bones. The reduction can be equal to or less than, for example, about 3%, about 5%, about 10%, about 15%, about 20%, about 25%, or about 30%. For example, the highest pressure applied by the rider's sit bones to the saddle can be reduced at least about 5% by the fitting process. The cushion material that overlays the support shell can be selected to further enhance comfort.

A thermal insulating molding cover can be placed on the support shell prior to molding. Once molding has been completed, another cover and padding can be installed on the support shell. A foam cushion can be installed to provide desired comfort. In other embodiments, the cushioning member can be permanently coupled to the support shell, and the support shell can be molded while the cushioning member provides thermal insulation.

A customizable bicycle saddle can comprise a support shell and a customizable ischial tuberosity panel. The support shell can include a first receiving feature and a second receiving feature. The ischial tuberosity panel can include one or more moldable materials, thermoplastic materials, or the like. In some embodiments, the panel includes a first ischial tuberosity bone supporting portion positionable in the first receiving feature and a second ischial tuberosity bone supporting portion positionable in the second receiving feature. The ischial tuberosity panel can be configured to mold to a rider's anatomy sitting on the customizable bicycle saddle after the thermoformable ischial tuberosity panel has been heated above a predetermined temperature.

The customizable ischial tuberosity panel can be configured to retain the rider's geometry when at room-temperature and is configured to be remolded when heated above the predetermined temperature. The inner support shell has a spine extending longitudinally along the bicycle saddle, and the spine is positioned between the first and second receiving features. The predetermined temperature can be a softening temperature, glass transition temperature, or a melt temperature of the thermoplastic material. The properties of the panel can be selected based on the desired customization process.

A method for fitting a bicycle saddle includes sensing a first pressure applied by a rider to the bicycle saddle, heating a moldable panel of the bicycle saddle, using an external heater, and molding the heated moldable panel to at least a portion of the rider. After molding the moldable panel, a second pressure applied by the rider to the bicycle saddle is sensed and compared to the first pressure. The method can further include detecting applied pressures to determine whether to reheat the moldable panel. The heater can be removed from the molded saddle.

The bicycle saddles can be formed in multi-step processes. For example, a support shell can be thermoformed to the rider's body. In a separate process, a cushioning member (e.g., cushioning member 170 of FIG. 5) can be customized in another process, such as a thermoforming process. This allows different parts of saddles to be customized individually to provide a desired fit. Although the bicycle saddles can be molded when fully assembled, the bicycle saddles can be partially or completely disassembled for molding and then reassembled. The dimensions, configurations, and materials of the seats or saddles can be selected based on the anatomy of the rider. Additionally, materials, saddles, techniques disclosed herein can be used with other types of seats or support elements.

In further embodiments, moldable elements of a saddle can extend across a substantial portion of the area that supports most of the rider's weight during use. In some embodiments, the moldable elements support at least 30%, 40%, 50%, 60%, 70%, 80%, or 90% of the user's weight applied to the saddle. Other portions of the saddle can be made of semi-rigid or rigid materials that generally maintain its shape. This allows the saddle to have selectively moldable regions suitable for thermoforming areas at which substantial pressure is applied. The rigid frame maintains the general overall contours and configuration of the saddle.

Moldable Bicycle Saddles and Fitting Procedures

FIG. 1 is a side view of a bicycle 100 with a bicycle frame 106, a seat post 108, and a bicycle saddle or seat 110 ("saddle 110"). The saddle 110 is connected to the bicycle frame 106 by the seat post 108. The saddle 110 can be custom fit to a rider using a fitting procedure involving thermoforming the saddle 110 to the rider's anatomy. The customized saddle 110 can provide a comfortable fit and can be reshaped any number of times to adjust the fit. If the rider's weight or size changes significantly, the saddle 110 can be remolded, for example. The bicycle 100 can be a road bike, mountain bike, touring bike, cruiser bicycle, or other type of bicycle.

The saddle 110 can be configured and customized based on the rider's anatomy, bicycle configuration, and/or other fitting criteria. For example, a female-specific saddle may be wider than a male-specific saddle because an average female typically has wider spacing between ischial tuberosities (i.e., sit bones). In another example, the saddle 110 can be a touring saddle or seat with a relatively long narrow nose for long distance rides. The configuration (e.g., overall shape), properties (e.g., cushioning properties), and construction of the saddle can be selected based on, for example, the saddle's intended use.

Figure 2:
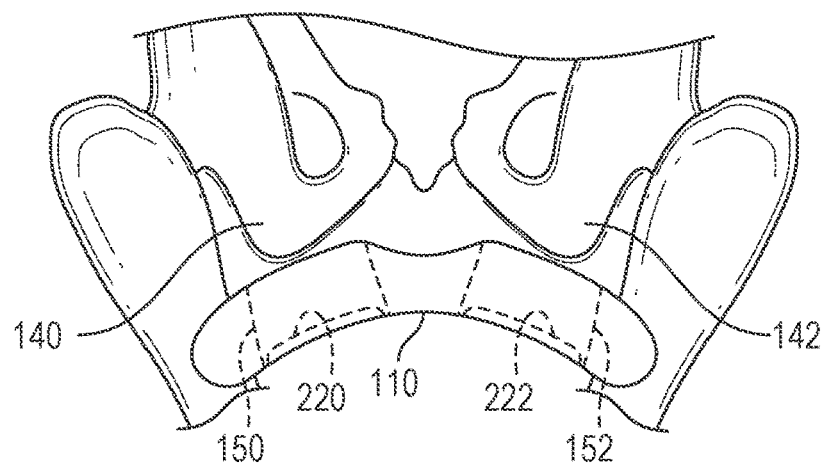
FIG. 2 is a rear view of a rider sitting on the bicycle saddle of FIG. 1.
Figure 3:
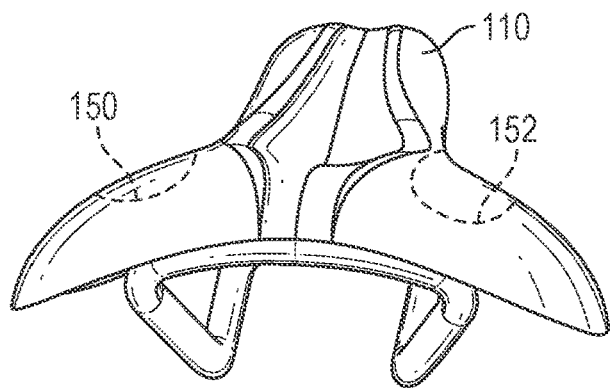
FIG. 3 is a rear perspective view of the bicycle saddle of FIG. 1.

FIG. 2 is a rear view of a rider's bones when sitting on the saddle 110. FIG. 3 shows the saddle 110 with moldable regions or portions 150, 152 (illustrated in a dashed line). The moldable portions 150, 152 can be positioned at desired locations to manage applied pressures. In some embodiments, the moldable portions 150, 152 can be positioned generally underneath respective sit bones 140, 142 (FIG. 2). The moldable portions 150, 152 can include one-piece or multi-piece moldable panels, moldable layers (e.g., foam layers), pads, inserts, or other elements that can be reshaped (e.g., via a thermal process) to conform to a user's body. The configuration, number of moldable regions, and their locations can be selected based on the configuration of the bicycle. For example, the sizes of the moldable regions for a road bicycle saddle can be different than the sizes of moldable regions for a mountain bicycle saddle. Although moldable panels are discussed primarily in the context of managing the pressure points associated with sit bones, the seats and saddles disclosed herein can be configured to manage pressures at other locations and can be fitted with or without taking any measurements during the fitting process.

Figure 4:
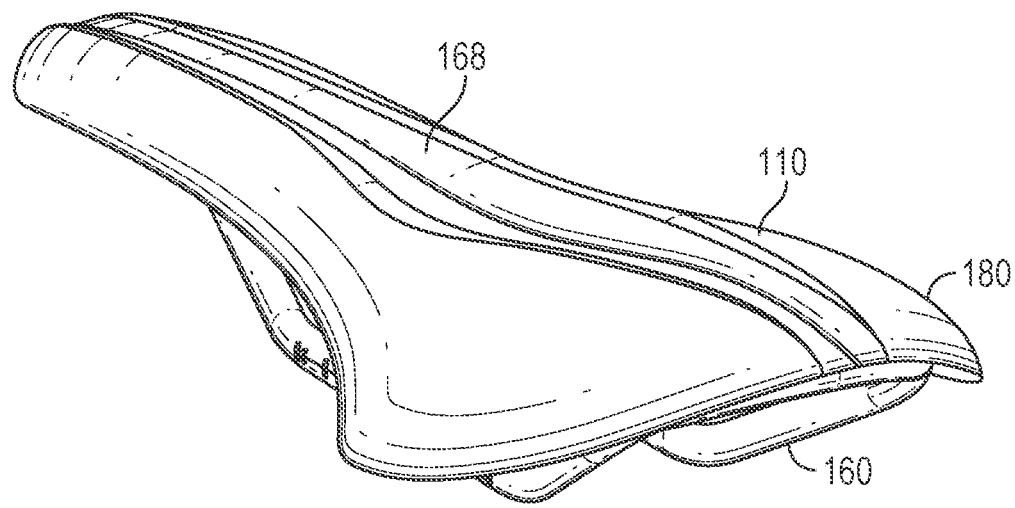
FIG. 4 is an isometric view of a bicycle saddle in accordance with an embodiment of the technology.

FIG. 4 is an isometric view of the saddle 110 in accordance with an embodiment of the technology. The saddle 110 can include a rail system 160 that can connect the bicycle saddle 110 to the seat post. The rail system 160 can include a pair of rails made, in whole or in part, of metal (e.g., titanium, aluminum, steel, etc.), polymers, composite materials (e.g., carbon fiber composite material, metal coated composite materials, etc.), or other suitable material. The configuration of the rail system 160 can be selected based on the connection to the seat post. The saddle 110 can also include a covering 180 that can be made, in whole or in part, of one or more natural materials (e.g., leather, cotton, etc.), synthetic materials (e.g., synthetic leather, nylon, etc.), or other suitable materials and can include one or more features, such as an optional groove, channel, or cutout 168.

Figure 5:
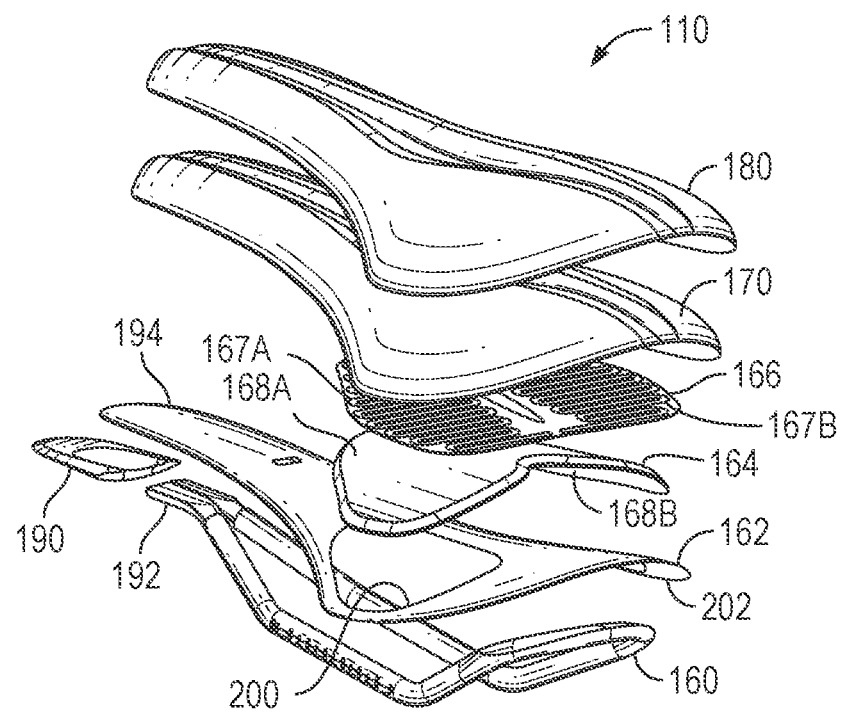
FIG. 5 is an exploded isometric view of the bicycle saddle of FIG. 4.

FIG. 5 is an isometric exploded view of the saddle 110 that includes an inner or base support shell 162, a customizable panel or region 164 ("region 164"), a thermal or thermoelectric element 166 ("thermal element 166"), and a cushioning member 170. The inner support shell 162 can be supported by the rail system 160 and can be configured to support the mass of a rider. A cover 190 can cover an end 192 of the rail assembly 160 and connect to the nose end 194 of the shell 162. The customizable region 164 can be integrally formed with the base support shell 162 or a separate component (shown in FIG. 5). In some embodiments, the region 164 is part of the base support shell 162.

The region 164 can be made, in whole or in part, of one or more thermoplastic materials (e.g., acrylic copolymer thermoplastic), thermoset materials, or other suitable materials that can be selectively reconfigured. In multipiece embodiments, the shell 162 defines receiving features 200, 202 positioned at locations for customization. The receiving features 200, 202 can be openings, cutouts, recessed regions, or combinations thereof. The region 164 can extend across the receiving features 200, 202. During a customization process, at least a portion of region 164 is capable of passing into and/or through the features 200, 202 to conform to the rider's anatomy, thereby limiting or minimizing high pressure areas, typically under the rider's sit bones. After completing the customization process, the region 164 can be generally rigid to maintain its shape.

The thermal element 166 can be used to selectively heat the region 164 to a predetermined temperature (e.g., a softening temperature, a glass transition temperature, a melt temperature, or other desired temperature) and can extend across a portion or most of the upper surface of the region 164. Operation of the thermal element 166 can be controlled based on monitoring of the thermoforming process. The thermal element 166 can remain embedded in the saddle during use and can then be used to perform additional customization processes. The thermal element 166 can be sandwiched between the cushioning member 170 and the region 164 to help isolate the heating within the saddle 110. The thermal element 166 can have addressable regions 167a, 167b operable to provide independent heating of regions of the region 164. For example, the regions 167a, 167b can be independently operated to heat the underlying regions 168a, 168b, respectively, of the region 164. If the region 168a is formed to a desired shape, the other region 168b can be thermoformed without affecting the region 168a. This allows for discrete thermoforming of selected regions of the region 164. The number of addressable regions of the thermal element 166 can be selected based on the desired control of the fitting process.

The cushioning member 170 can be a thermal barrier that helps limit the temperature of outer surface of the seat, thereby preventing rider discomfort during molding. The thermal element 166 can be sufficiently compliant to conform to the molded shape of the region 164 to remain in thermal contact with the upper surface of the region 164.

Figure 6:
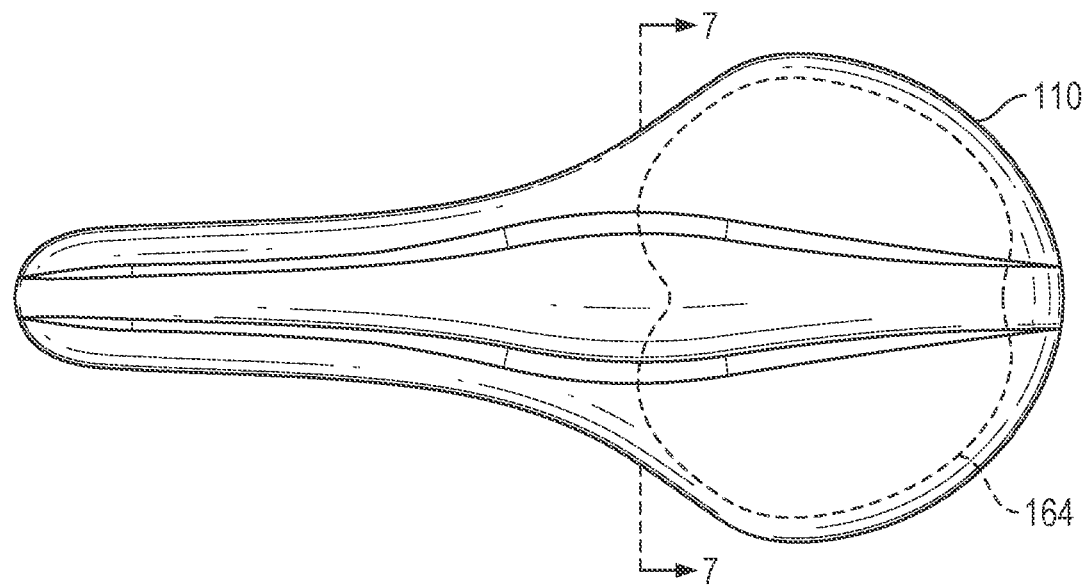
FIG. 6 is a top plan view of the bicycle saddle of FIG. 4.
Figure 7:
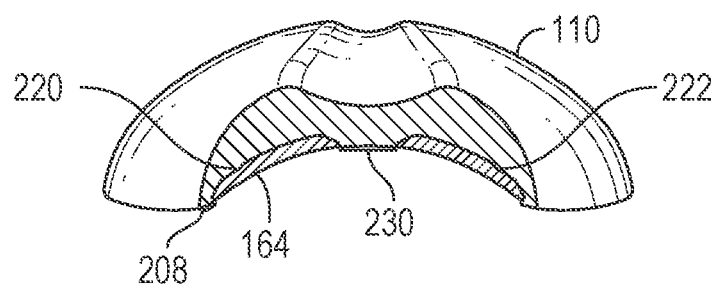
FIG. 7 is a cross-sectional view of the bicycle saddle of FIG. 6 taken along line 7-7 of FIG. 6.

FIG. 6 is a top view of the saddle 110 in accordance with an embodiment of the technology. FIG. 7 is a cross-sectional view of the saddle 110 taken along line 7-7 of FIG. 6. Referring now to FIG. 7, sit bone support wings or portions 220, 222 of the region 164 are positioned on either side of a central spine 230 of the shell 208. The central spine 230 can help support the rider's weight to minimize, limit, or substantially prevent sagging, excessive pressure on the perineal gland, or the like.

Figure 8:
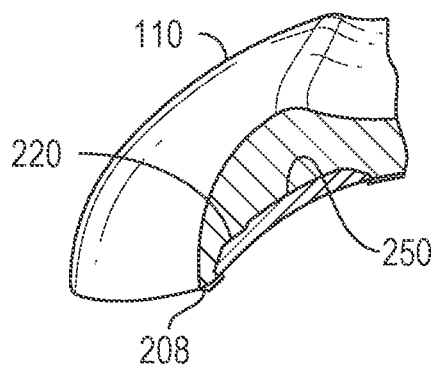
FIG. 8 is a detailed cross-sectional view of a portion of the bicycle saddle of FIG. 7.
Figure 9:
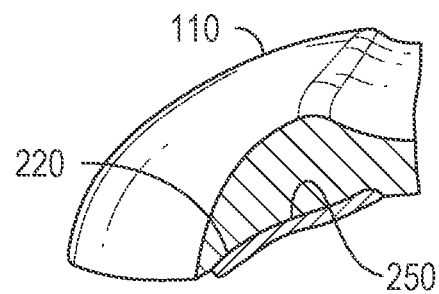
FIG. 9 is a detailed cross-sectional view of a portion of the bicycle saddle of FIG. 7 after customization.

FIGS. 7 and 8 show the portion 220 prior to molding. FIG. 9 shows the portion 220 after it has been molded. The contoured surface 250 of the portion 220 has been moved downwardly to help distribute pressure applied by the rider across the upper surface of the saddle 110. The portion 220 can be molded any number of times. The portion 220 can be molded to reduce the maximum pressure applied to the seat by a predetermined amount. For example, the maximum pressure can be reduced at least about 5%, about 10%, about 15%, about 20%, or other suitable amount to avoid excessive pressures. This helps distribute pressures applied by, for example, the sit bones to comfort manage pressure hot spots. The amount of displacement and contouring of the portion 220 will depend on the rider's anatomy and weight. Additionally, the dimensions and positions of portions 220 can be selected based on the configuration of the saddle. For example, a saddle with a width of 140 mm can have portions 220 that are closer together than a saddle with a width of 150 mm.

Figure 10:
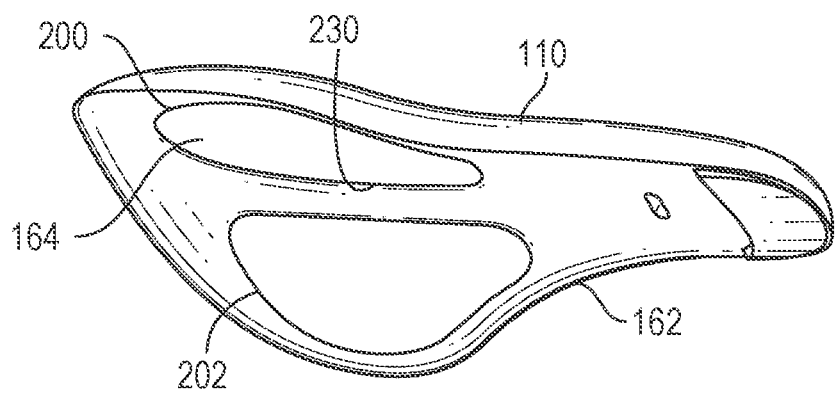
FIG. 10 is a bottom perspective view of an inner support shell in accordance with an embodiment of the technology.
Figure 11:
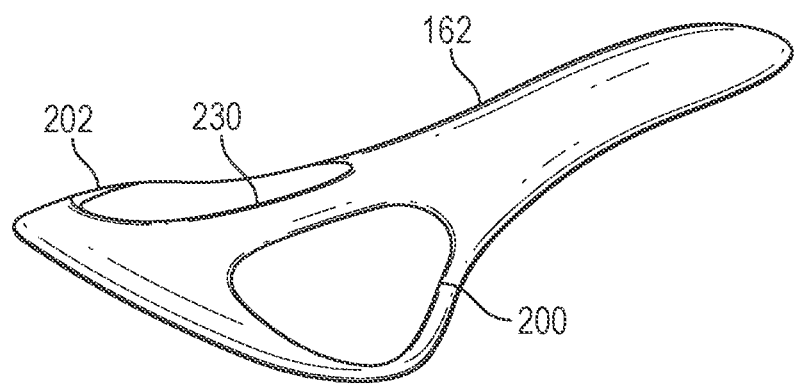
FIG. 11 is an isometric view of the inner support shell of FIG. 10.
Figure 12:
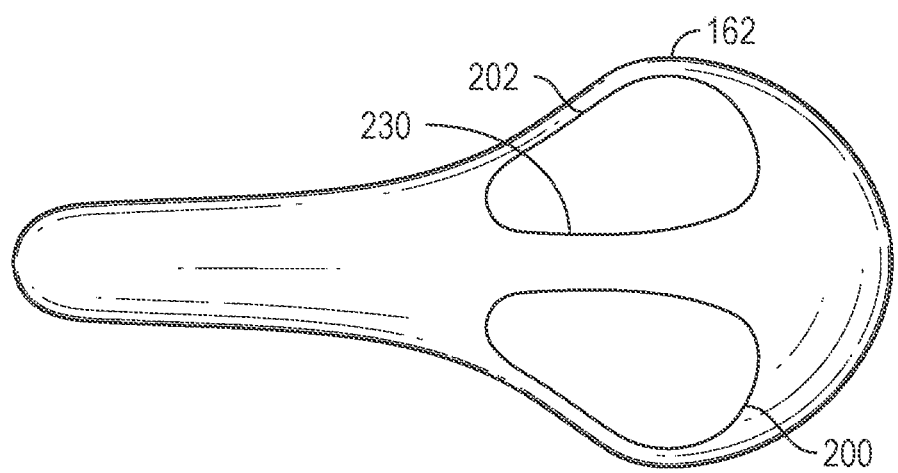
FIG. 12 is a top plan view of the inner support shell of FIG. 10.

FIG. 10 is a bottom isometric view of the saddle 110 in accordance with an embodiment of the technology. FIG. 11 is a top isometric view of the shell 162. FIG. 12 is a top view of the shell 162. Referring to FIGS. 11 and 12, the receiving features 200, 202 can be cutouts that are substantially larger than the rider's sit bones to allow the portion of the region 164 (FIG. 5) in the form of a panel extending across the openings to move downwardly into and/or through the openings. This allows the region 164 (FIG. 5) to deflect a substantial amount during the molding process and avoids or limits lateral spreading of the region 164. In other embodiments, the receiving features 200, 202 can be in the form of receiving recesses or depressions that can include one or more walls, ridges, and other features for managing spreading or movement of the moldable material. The shell 162 and customized region 164 can be generally rigid to support the overlying parts of the saddle 110. The dimensions of the spine 230 and the receiving features 200, 202 can be selected based on the desired pressure to the perineal gland, sit bones, and other features of the rider. For example, saddle dimensions can be selected to ensure that the pressure on the perineal gland is no greater than a select amount of pressure (e.g., about 20%, about 25%, about 30%, about 35%, about 40%, about 45%, or about 50% of the pressure applied to the sit bones).

Figure 13:
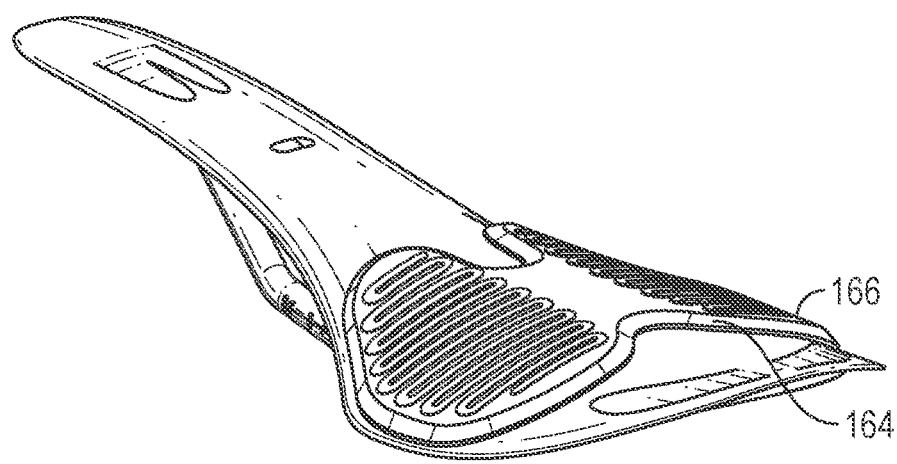
FIG. 13 is an isometric view of internal components of a bicycle saddle in accordance with an embodiment of the technology.

FIG. 13 is an isometric view of internal components of the saddle in accordance with an embodiment of the technology. The thermal element 166 can be coupled to adjacent components via adhesive, couplers (e.g., rivets), bonding agent, or combinations thereof. In other embodiments, the thermal element 166 can be attached, embedded, or encapsulated in the moldable region 164.

Figure 14:
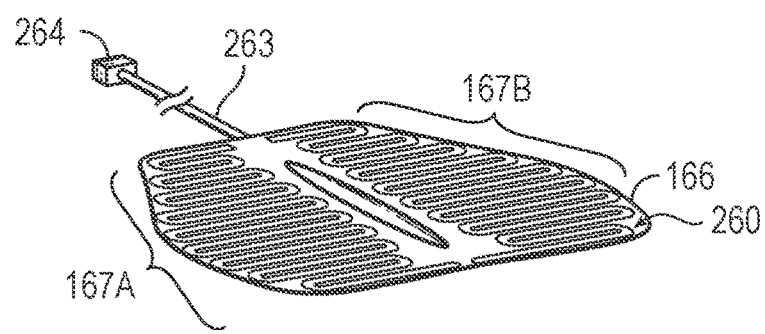
FIG. 14 is an isometric view of a thermal assembly in accordance with an embodiment of the technology.

FIG. 14 is an isometric view of the thermal element 166 in accordance with an embodiment of the technology. The thermal element 166 can include a thermoelectric element 260 ("element 260"), a connector 263, and a plug 264. The connector 263 can provide power from the plug 264 to the element 260. The connector 263 can include one or more wires, including a bundle of wires, that provide electrical energy from the plug 264 to the element 260. In some embodiments, the connector 263 can be configured to provide power to the entire element 260 for uniform heating. In selectively addressable heater embodiments, the connector 263 can have multiple sets of wires to provide for independent operation of regions 167a, 167b of the element 260. In the illustrated embodiment, the regions 167a, 167b are on opposite sides of a midline or sagittal plane of the saddle when installed. The connector 263 can include one set of wires that powers the region 167a and another set of wires that powers the region 167b.

Figure 15:
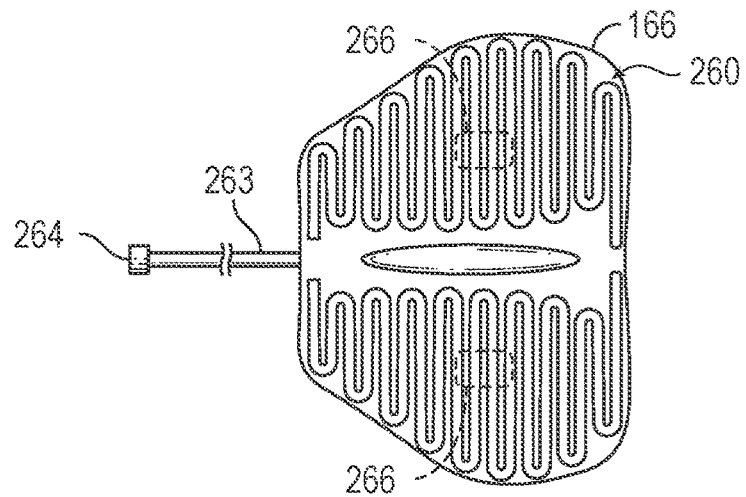
FIG. 15 is a top plan view of the thermal assembly of FIG. 14.

The element 260 can include one or more regions (as discussed above) that generate heat from electrical energy. In one embodiment, each region can include nickel chromium tracing with an adhesive backing for adhering to the region 164. Additionally or alternatively, the element 166 can include one or more Peltier devices, thermoelectric devices (e.g., resistive heaters), sensors (a sensor 266 is shown in dashed line in FIG. 15), or combinations thereof. The sensors can be temperature sensors, pressure sensors, contact sensors, or other sensors for providing desired detection and/or measuring. For example, temperature sensors can be used to monitor temperatures during the fitting process, and pressure sensors can be used to measure pressures to ensure a comfortable fit or to track a rider's data. The components of the element 166 can be flexible to assume different configurations without affecting performance of the element 166. This allows the thermal element 166 to be used to perform any number of molding procedures. For example, the element 260 can be a flexible resistive heater capable of experiencing significant deformation and/or displacement without any appreciable impairment of the element 260's heating/cooling capabilities.

Figure 16A:
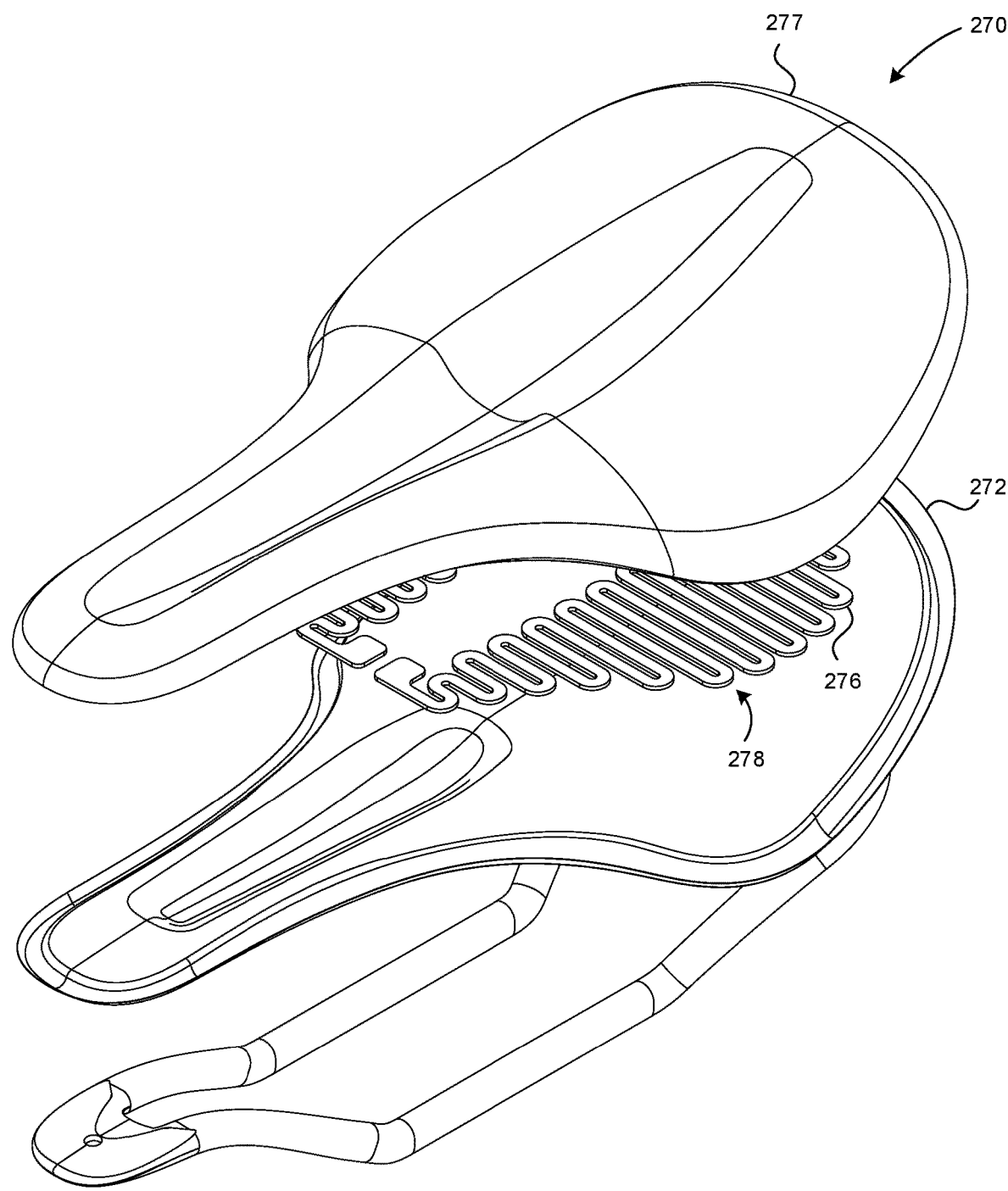
FIGS. 16A and 16B are exploded isometric views of a bicycle saddle in accordance with an embodiment of the technology.
Figure 16B:
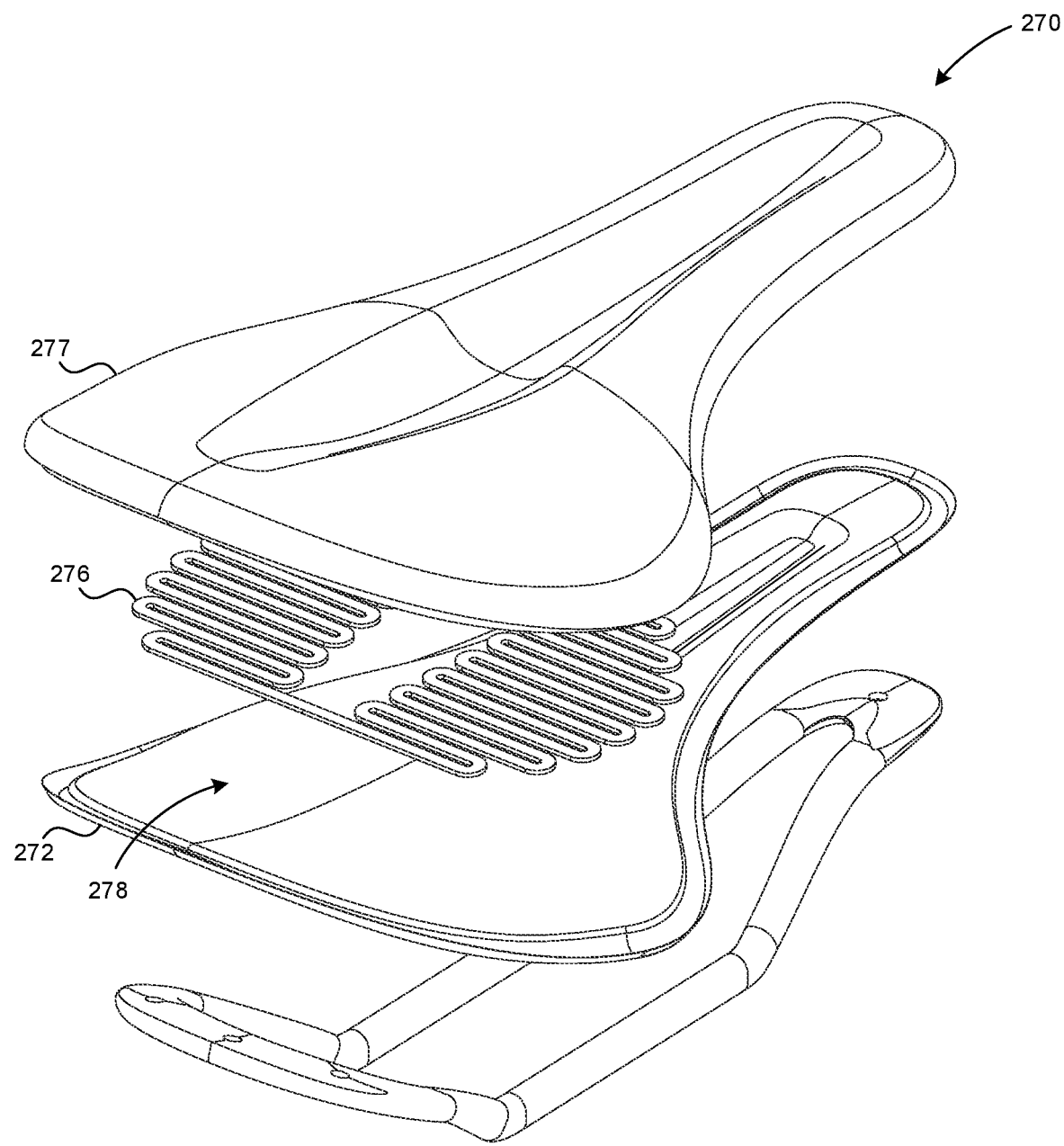

FIGS. 16a and 16b are exploded isometric views of a bicycle saddle 270 in accordance with an embodiment of the technology. The saddle 270 can include an inner or base support shell 272, a thermal or thermoelectric element 276 ("thermal element 276"), and a cushioning member 277. The base support shell 272 can include a customizable region 278 ("region 278") in thermal contact with the thermoelectric element 276. The base support shell 272 can be made, in whole or in part, of acrylic copolymer plastic, thermoplastic material, thermoset resins, or other types of moldable materials. In one embodiment, the base support shell 272 is an acrylic thermoplastic sheet or member with a thickness equal to or less than about 2.5 mm, about 3 mm, about 3.2 mm, about 3.5 mm, about 4 mm, or the like. The material can be sufficiently thick to maintain its post-molded shape during normal use. In some embodiments, the base support shell 272 can include one or more thermoformable layers and can be replaceable or permanent. For example, the base support shell 272 can be a single layer made of a thermoplastic material, such as a thermoplastic blend or single thermoplastic material.

Figure 17A:
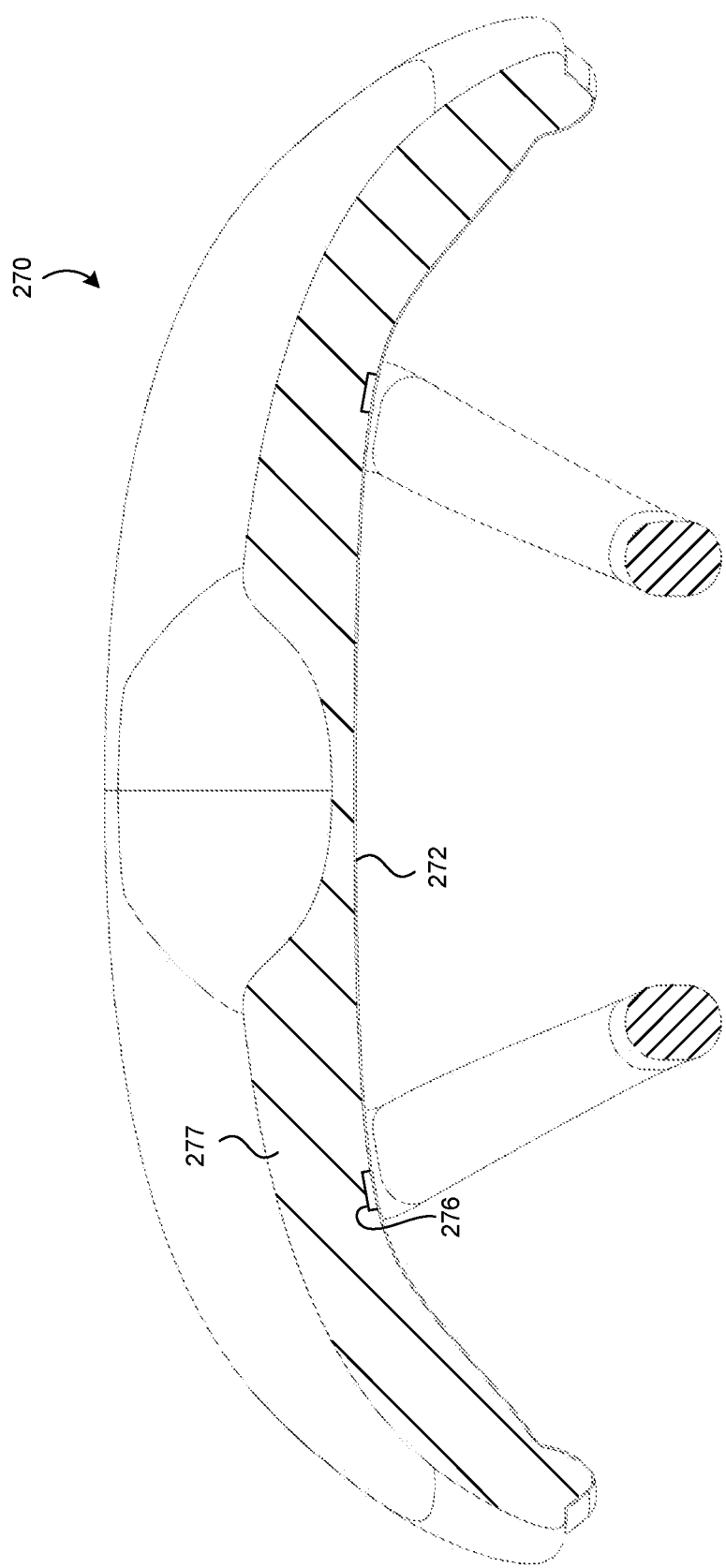
FIG. 17A is a transverse cross-sectional view of the bicycle saddle of FIGS. 16A and 16B.
Figure 17B:
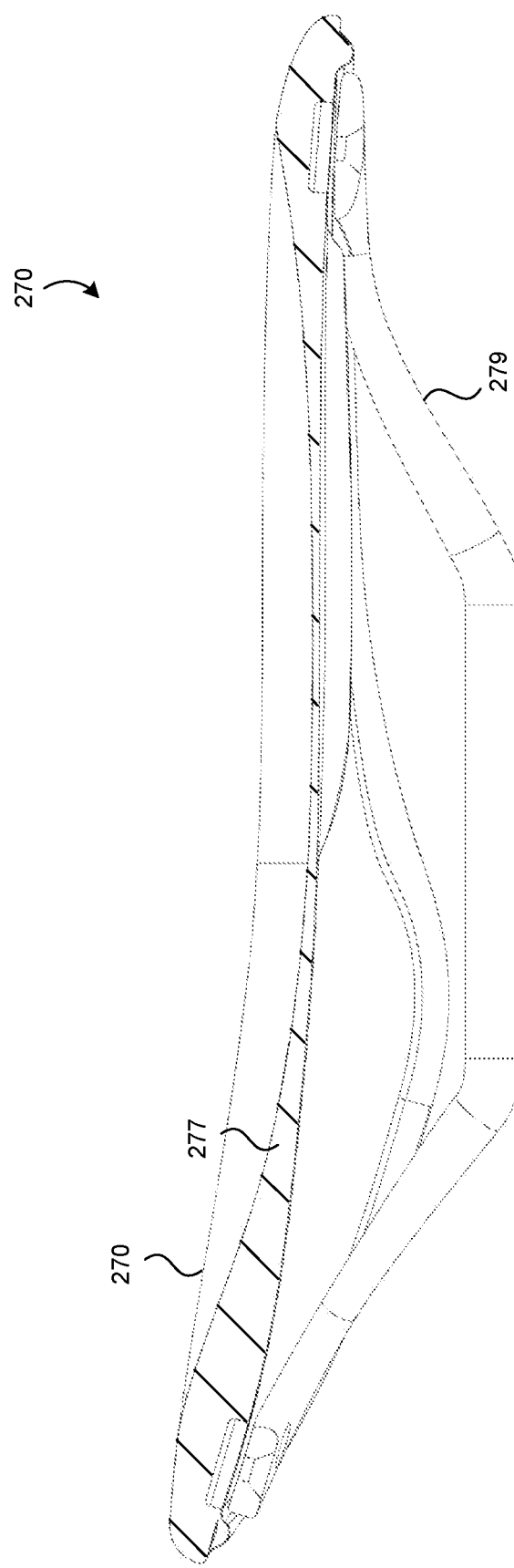
FIG. 17B is a longitudinal cross-sectional view of the bicycle saddle of FIGS. 16A and 16B.

FIG. 17a is a transverse cross-sectional view of the bicycle saddle 270. FIG. 17b is a longitudinal cross-sectional view of the bicycle saddle 270. FIG. 17a shows the thermal element 276 positioned underneath the cushioning member 277. FIG. 17b shows a rail 279 coupled to the saddle 270.

The saddle and heaters, whether internal or external, can have different types of thermal elements. Exemplary thermoelements include, without limitation, heating/cooling channels, thermoelectric elements, or combinations thereof. The moldable portions of the saddle can support a significant portion of the rider's mass. In some embodiments, the moldable portions of the saddle can support at least about 50%, about 60%, about 70%, about 80%, or about 90% of the total mass of the rider such that majority of the mass supporting portion of the saddle is molded to the rider's body. During the molding process, the rider can pedal the bicycle and assume normal riding positions. The cushioning element of the saddle can ensure that the thermoelement does not alter the cushioning characteristics of the saddle. Thermoelements can be embedded in the cushioning member, the support shell, moldable panels, or components of the saddle. In some embodiments, the thermoelement is sandwiched between the cushioning member and a moldable panel extends across one or more openings of a rigid shell. The rigid shell can maintain its shape during and/or after the molding process. For example, the rigid shell can be made of metal, carbon fiber, or another suitable material capable of withstanding relatively high temperatures without experiencing substantial permanent deformation.

Figure 18:
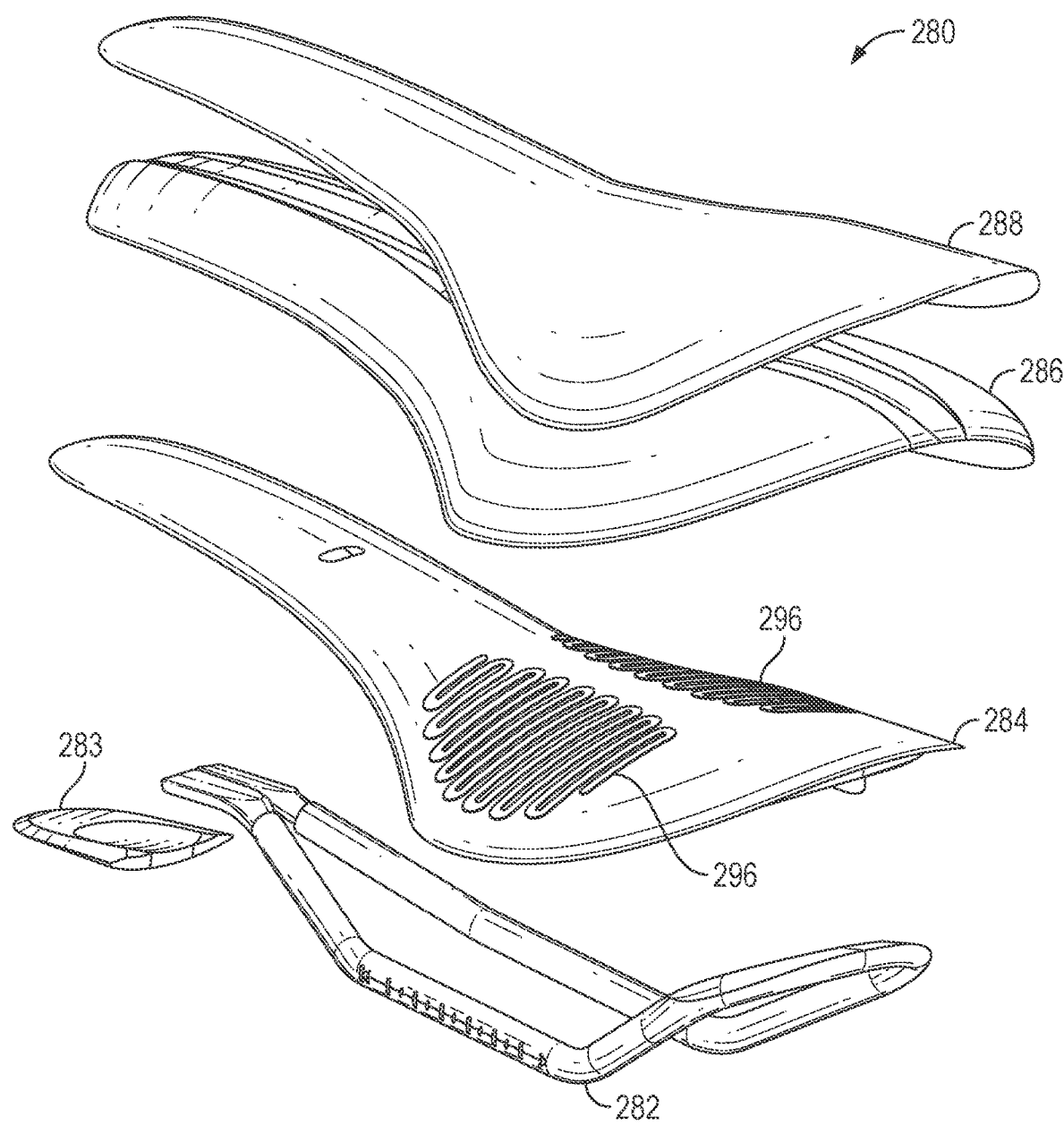
FIG. 18 is an exploded isometric view of a bicycle saddle in accordance with an embodiment of the technology.

FIG. 18 is an exploded isometric view of a bicycle saddle 280 in accordance with an embodiment of the technology. The bicycle saddle 280 can include a rail system 282, a customizable support shell 284, a cushioning member 286, and a covering 288. The customizable support shell 284 can be a base shell supported by the rail system 282. An optional nose piece 283 can couple the rail system 282 to the shell 284. The description of the saddle 110 discussed in connection with FIGS. 1-17B applies equally to the saddle 280, except as detailed below.

The support shell 284 can include one or more integrated thermal or thermoelectric elements 296. The bicycle saddle 280 has two spaced apart thermoelectric elements 296, each positioned generally underneath the rider's sit bones during use. During a molding procedure, the thermoelectric elements 296 can heat regions of the support shell made of thermoplastic material to thermoform those regions.

Figure 19:
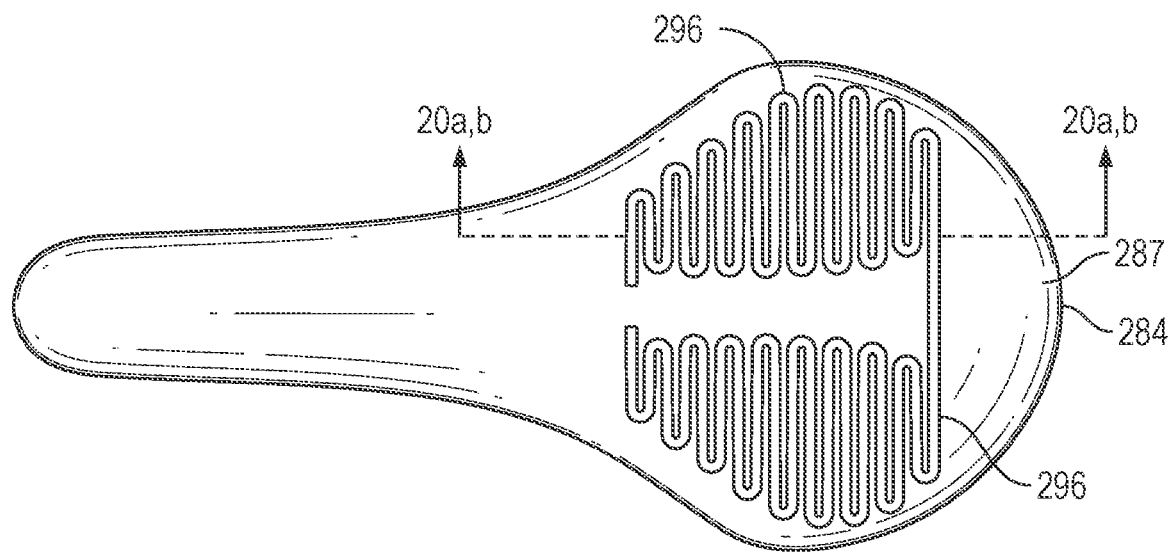
FIG. 19 is top plan view of a support shell in accordance with an embodiment of the technology.

FIG. 19 is a top view of the bicycle saddle 280 in accordance with embodiment of the technology. The support shell 284 includes a main body 287 that can be made, in whole or in part, of thermomolecular plastic materials. The thermoelectric elements 296 can be interconnected or connected resistive heaters that are attached to or embedded in the main body 287. In some embodiments, the thermoelectric elements 296 can be electrically connected to one another to heat opposite sides of the saddle to uniform temperatures. In other embodiments, the thermoelectric heaters 296 can be electrically isolated to individually mold opposite sides of the saddle. For example, each side of the saddle can be molded at different times to enable enhances customization.

Figure 20A:
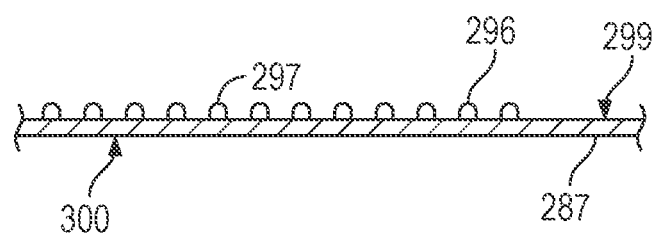
FIG. 20a is a cross-sectional view of the support shell taken along line 20a-20a of FIG. 19.

FIG. 20a is a cross sectional view of the support shell 284 taken along line 20a-20a of FIG. 19. The thermoelectric element 296 can include an array of elements 297 (one identified) attached to an upper surface 299 of the main body 287. The elements 297 remain in thermal contact with the upper surface 299 throughout use. In other embodiments, the elements 297 can be attached to an undersurface 300 of the main body 287. The elements 297 can also be positioned at other locations. In some embodiments, elements 297 are positioned along both the upper surface 299 and the bottom surface 300. The position, number, and configuration of the elements 297, whether resistive elements or cooling channels, can be selected based on the desired comfort of the seat, desired heating characteristics, or the like.

Figure 20B:
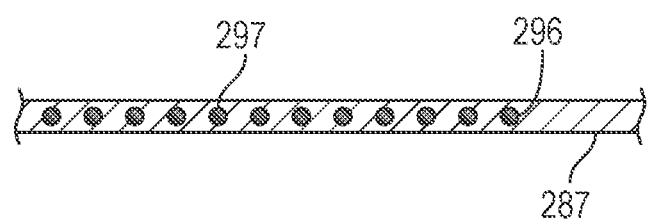
FIG. 20b is a cross-sectional view of the support shell taken along line 20b-20b of FIG. 19 in accordance with another embodiment of the technology.

FIG. 20b is a cross-sectional view of the support shell 284 take along the line 20b-20b of FIG. 19 in accordance with another embodiment. The description of the thermoelectric element 296 of FIGS. 19 and 20a apply equally to FIG. 20b except as detailed below. FIG. 20b shows the elements 297 embedded in the main body 287. The elements 297 can be flexible for molding the main body 287 to highly contoured shapes without damaging the thermoelectric element 296.

Figure 21:
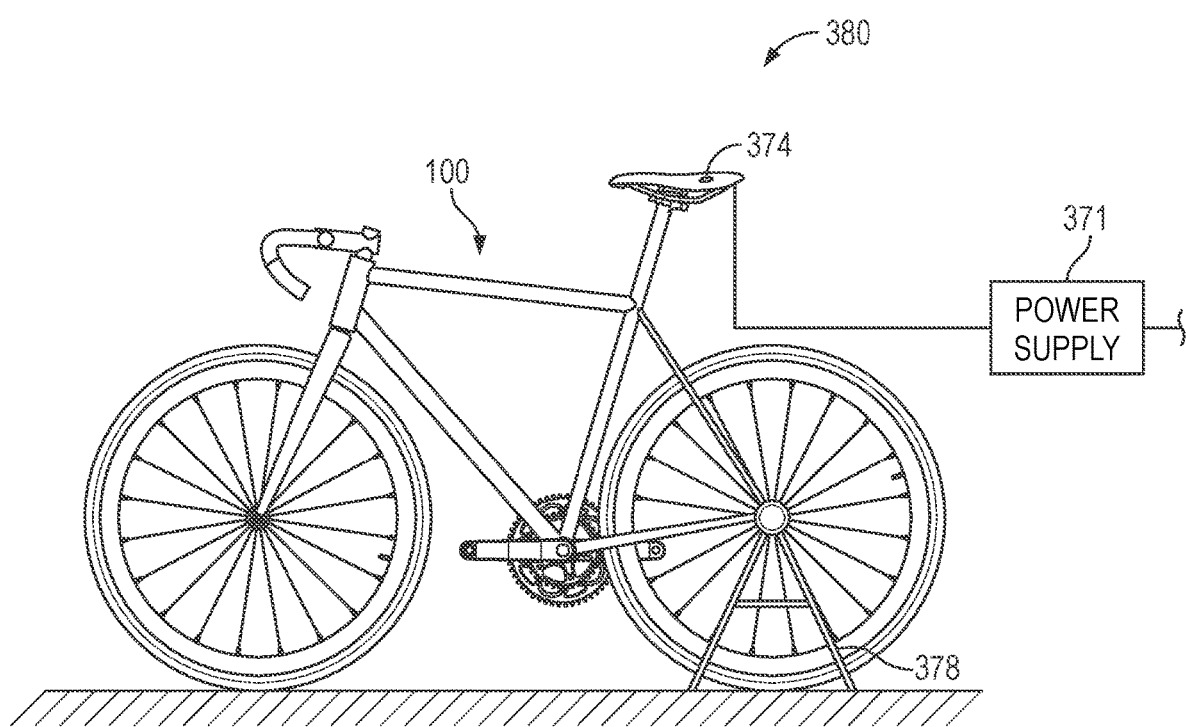
FIG. 21 illustrates a system for customizing a bicycle saddle in accordance with an embodiment of the technology.

FIG. 21 illustrates a system 380 for customizing a bicycle saddle in accordance with an embodiment of the technology. The system 380 includes the bicycle 100 and a stand 378. The system 380 can include optional sensors 374, such as pressure sensors, contact sensors, force sensors, or other suitable detectors for sensing desired parameters. Electrical components of the saddle (e.g., sensors, heating elements, etc.) can receive power from an electrical power source 371, such as an AC outlet, via a wired connection, or power from an internal power source, such as a battery integrated into the saddle. The system 380 can also include optional rider monitoring or positioning equipment.

Figure 22:
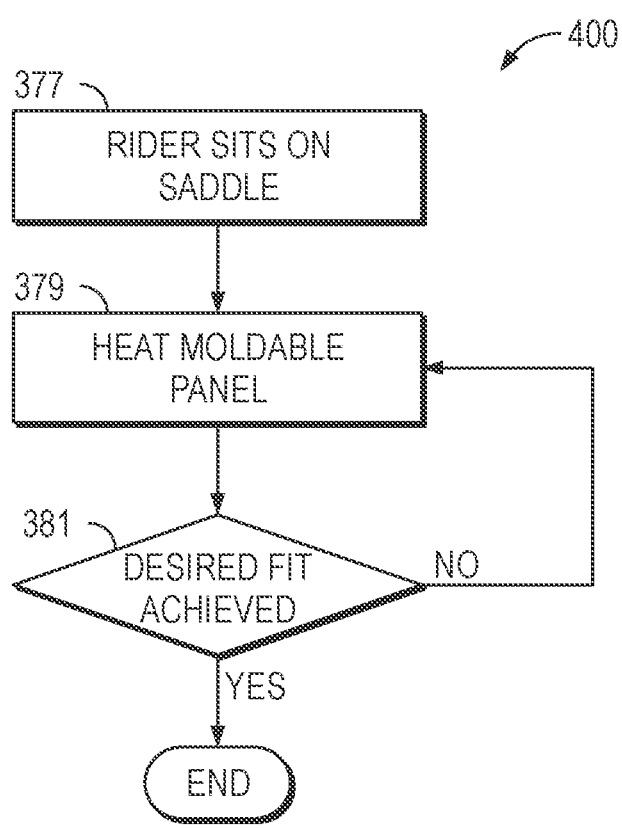
FIG. 22 is a method for fitting a bicycle saddle in accordance with an embodiment of the technology.

FIG. 22 illustrates a method 400 for fitting a saddle in accordance with an embodiment of the technology. The method 400 can be performed using the systems discussed in connection with FIGS. 21 and 31-33 or other systems disclosed herein.

At block 377, a rider can sit on the saddle and ride the bicycle. The bicycle can be set up based on the rider's anatomy. For example, the saddle height can be set using various fitting techniques.

At block 379, the saddle can be heated for thermoforming before or after the rider begins riding. A heating element (e.g., thermal element 166 discussed in connection with FIG. 5) can be used to internally heat the region 164. The cushioning member 170 (FIG. 5) can thermally insulate the element 166 to avoid overheating the rider. In some embodiments, the cushioning member 170 can be a foam covering with geometry that generally matches the geometry of the inner support shell 162. In one embodiment, the cushioning member 170 comprises, in whole or in part, urethane foam. In other embodiments, the panel can be integrated with or part of the shell or support structure of the saddle. The cushioning member 170 can thermally insulate heating elements to avoid overheating the rider. In some embodiments, the cushioning member 170 can be a foam covering with geometry that generally matches the geometry of the inner support shell 162. In one embodiment, the cushioning member 170 comprises, in whole or in part, urethane foam.

An external heating source (e.g., a forced convection heater, a hot air gun, a hair dryer, an external heater, microwave, etc.) can be used to heat the seat 110. In some procedures, the saddle is heated in an oven or another suitable heating environment. Temperature sensors can be coupled to the outside or can be located within the saddle to track the temperatures. If a moldable component of the saddle is heated with an external element, the saddle can be monitored with a temperature detector. The external element can be applied to the bottom or top of the saddle.

Once customized, the saddle can be passively or actively cooled until it retains its shape. For example, a molded panel can be actively cooled via liquid (e.g., chilled water), Peltier devices, or air cooled (e.g., convection air cooled). Alternatively, the panel can be allowed to be passively cooled via the surrounding environment, which may be at or near room temperature.

At block 381, the panel can be remolded based on rider feedback, diagnostic results, or the like. The original saddle set up and data can be compared with the unmolded seat data to compare the pressure, pressure peaks, rider feedback, or other parameters. If the desired fitting is not achieved, the method 400 can return to block 379. The panel can be thermally processed any number of times until a desired fit is achieved. If the rider's weight or size changes significantly, the saddle may become uncomfortable. The method 400 can be performed to refit the saddle.

The heating parameters can be controlled based on rider feedback, collected data, visual inspection (e.g., by a fitting specialist), etc. The heating parameters can include, without limitation, heating profiles, heat maps, target temperatures, or the like. The heating parameters can also be correlated to output from sensors to provide for a customized molding process. For example, selected regions of a heater can be activated corresponding to regions with relatively high pressures, thereby allowing thermoforming of the high-pressured regions only. The rider's feedback can also be incorporated into the thermoforming process. If the rider identifies an uncomfortable region, the corresponding a region of the heater can generate thermal energy to mold the identified uncomfortable region. The saddle can have integrated sensors corresponding to the selectively heatable regions. This allows for data to be collected for each region before, during, and after a thermoforming process. The data can be analyzed to provide recommendations about additional molding processes, adjustments to the bicycle set up, or the like. Both internal and external heaters can be configured for addressable heating.

Figure 23:
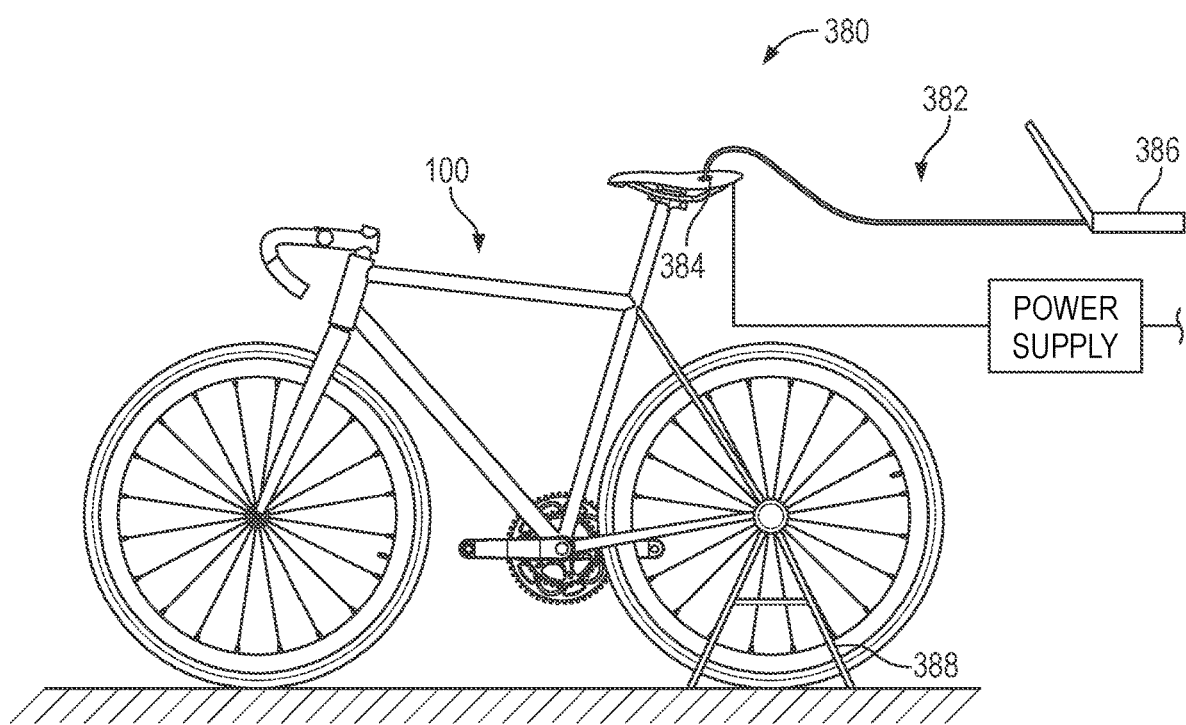
FIG. 23 illustrates a system for customizing a bicycle saddle in accordance with another embodiment of the technology.

FIG. 23 illustrates a system 380 for customizing a bicycle saddle in accordance with an embodiment of the technology. The system 380 includes the bicycle 100 and a fitting system 382. The fitting system 382 can include one or more sensors 384, a computing device or computer 386, and a stand 388. The sensors 384 can be pressure sensors, contact sensors, force sensors, or other suitable detectors for sensing desired parameters. In some embodiments, the sensors 384 are coupled to or integrated into the seat. In other embodiments, sensors 384 can be separate components that are placed on the seat 110 during the fitting process and then removed. Electrical components of the saddle (e.g., sensors, heating elements, etc.) can be powered by an electrical power source 285, such as an AC outlet, a battery, or the like.

A computing device 386 is in communication with the sensors 384 and can be a laptop computer, a smartphone, or other computer device. Examples of computing devices, environments, and/or configurations that may be suitable for use with the technology include, but are not limited to, personal computers, server computers, handheld or laptop devices, cellular telephones, wearable electronics, tablet devices, multiprocessor systems, microprocessor-based systems, distributed computing environments that include any of the above systems or devices, or the like. For example, the computing device 386 can be a tablet that communicates with the sensor 384 via a wired connection or wirelessly via a local area network. The computing device 386 can include one or more input devices that can include, for example, a mouse, a keyboard, a touchscreen, an infrared sensor, a touchpad, a wearable input device, a camera- or image-based input device, a microphone, or other user input devices.

The computing device 386 can include memory that has one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory can include program memory that stores programs and software, such as an operating system, a data management system, and other application programs, such as fitting programs, molding programs, heating programs, or the like. The fitting programs can include instructions for determining recommendations based upon input from one or more sensors, the rider, or another source. For example, the computing device 386 can receive sensor data when a rider is supported by the saddle. Based on the received data, the computing device 386 can use the fitting program to determine an appropriate saddle configuration, position, molding process, or the like. The molding programs can include temperature profiles or mappings, targeted pressure mappings, pressure reduction programs, programs for controlling addressable heaters, or the like. The computing device 386 can execute instructions of the molding program to analyze data from sensors to determine how to control addressable heater assemblies. Feedback from one or more sensors and/or the rider can be used to determine, at least in part, instructions or power sent to the heater assembly. In some embodiments, the memory can store programs for performing the method discussed in connection with FIG. 22.

Figure 24:
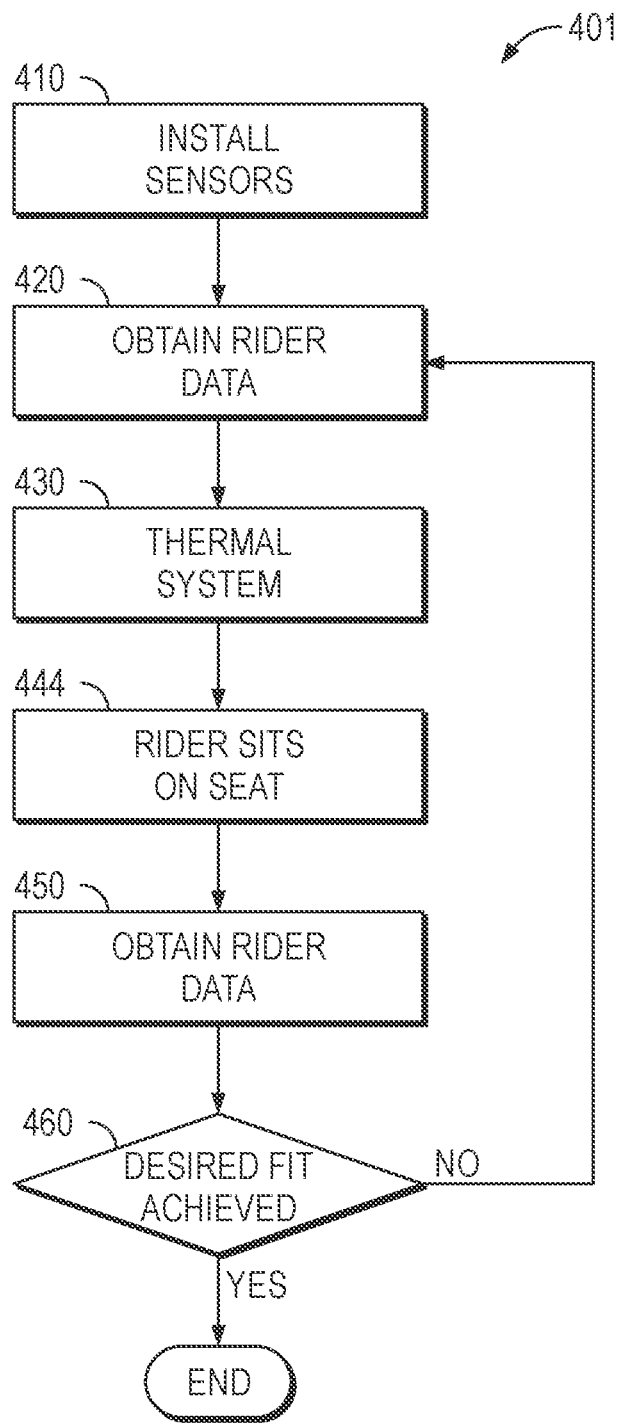
FIG. 24 is a method for fitting a bicycle saddle in accordance with another embodiment.

FIG. 24 illustrates a method 401 for fitting a saddle in accordance with an embodiment of the technology. The method 401 can be performed using the system discussed in connection with FIG. 23 and FIGS. 32-34 and the description of the method 400 of FIG. 22 applied equally to method 401 unless indicated otherwise.

At block 410, sensors can be installed on a bicycle saddle to map pressures applied by a user to a seat. Sensors can also be positioned in other locations along the bicycle. Additionally or alternatively, motion sensors can be used to track the rider's movement.

At block 420, rider data can be obtained to determine one or more baseline measurements. In some procedures, pressures associated with the sit bones can be measured. The bicycle saddle can be installed on a bicycle at a desired location to achieve a desired body position. Once the bicycle is set up, the panel can be heated to a predetermined temperature suitable for molding.

At block 430, a heating element (thermal element 166 discussed in connection with FIG. 5) of a thermal system can be used to internally heat the region 164. External heating elements can also be used to heat the region 164 and are discussed in connection with FIGS. 31-33.

Additionally or alternatively, an external heating source can be used to heat the seat 110. The panel can be heated with a hair dryer, an oven, or suitable heating environment. Temperature sensors can be coupled to the outside or can be located within the saddle to track the temperatures. If the panel is heated with an external element and then installed in the saddle, it can be monitored with a temperature detector (e.g., a laser gun) to ensure that the temperature of the panel, including temperatures across the panel, are at desired levels.

At block 440, the rider can sit on the seat and can pedal the bicycle for a set period of time. At various times, the rider can change body positions for a range of normal riding positions. For example, the rider can periodically change from an upright to a forward position at regular or irregular intervals. In some procedures, the rider can pedal for two minutes, five minutes, six minutes, seven minutes, eight minutes, nine minutes, ten minutes, fifteen minutes, 20 minutes, or another length of time. The length of time the rider pedals can be selected based on the thermoforming characteristics of the panel and the temperature of the panel at the start of the pedaling period. In some fitting procedures, the rider can pedal the bicycle for a length of time generally corresponding to a length of time at which the region 164 is sufficiently warm for molding.

At block 450, rider data can be obtained. Measurements associated with the pressure applied to the seat (e.g., sit bone pressure measurements) can be continuously or periodically obtained while the user pedals the bicycle, as well as after the rider completes pedaling. If the bicycle saddle does not have internal pressure sensors, a pressure sensor (e.g., sensor 374 in FIG. 21) can be installed on the bicycle saddle to take pressure recordings for a set period of time (e.g., 10 seconds, 20 seconds, 30 seconds, 45 seconds, and 1 minute, 3 minutes, and 5 minutes). In other embodiments, the saddle can be fitted without taking rider measurements. For example, the rider can determine an appropriate fit based on comfort level without any pressure or force measurements.

At block 460, if the desired fit is achieved, the fitting procedure is completed. If the desired fitting is not achieved, the method 401 can return to block 430 to remold the saddle.

The saddle can be thermally processed any number of times until a desired fit is achieved. The original saddle set up and data can be compared with the unmolded seat data to compare pressures, pressure peaks, pressure reductions, and the rider feedback.

A wide range of fitting procedures can be used for bicycle saddles disclosed herein. In some procedures, the handlebar to nose dimension and a pitch angle on the bicycle and saddle set up are measured. A pressure mapping sensor can be installed on the bicycle to take interval recordings of pressure measurements.

In some fitting procedures, moldable bicycle seat can be installed on the seat post and positioned in the same location as the previous conventional seat. A pressure sensor can be positioned on the seat for interval data collection. Optionally, the position of the seat can be micro adjusted fore-and-aft to position the sit bones within moldable regions, achieve desired comfort, or the like. Additionally, and alternatively, the pitch can be adjusted to adjust pressure at the nose. For example, the nose can be angled a certain angle (e.g., by 1°, 2°, 3°, 4°, etc.) from horizontal to begin the fitting process. The tilt angle can be adjusted during the fitting. Once fitted, the thermoforming process can be performed.

In some procedures, the seat saddle can be removed from the bicycle post and then heated to a desired temperature. The target temperature can be equal to or higher than about 50° C., about 55° C., about 60° C., about 65° C., about 70° C. or other temperatures based on the suitable temperature of the panel for molding. Temperature sensors can be used to measure the temperature of the surface of the seat, moldable panel and/or other component. In embodiments with internal heaters of the seat saddle, the saddle can be left on the bicycle during the heating process. If the saddle is removed for heating, it can be reinstalled on the bicycle at the desired position.

A rider can mount the bicycle and can pedal for a period of time while periodically moving their position to normal riding positions. The pressure sensor can detect the pressure applied to the saddle to evaluate the fit. The data before and after the molding process can be compared to determine whether additional molding should be performed. If additional molding should be performed, the data can be analyzed to determine parameters of the molding process, such as the length of the molding process, target molding temperature, or the like. The seat saddle can be removed at any number of times at any point in time to readjust the fit as needed.

Figure 25:
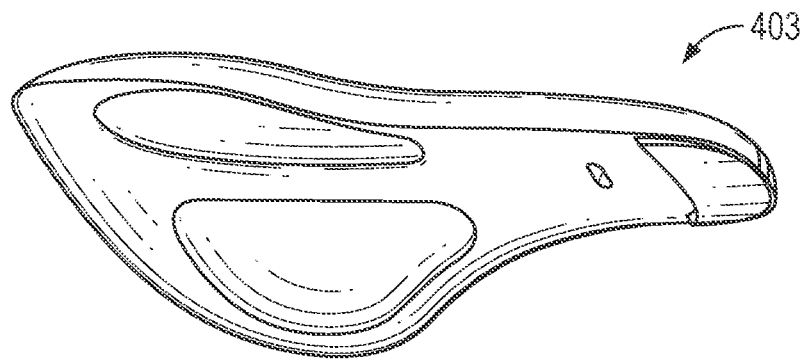
FIG. 25 is a bottom isometric view of a bicycle saddle in accordance with an embodiment of the technology.
Figure 26:
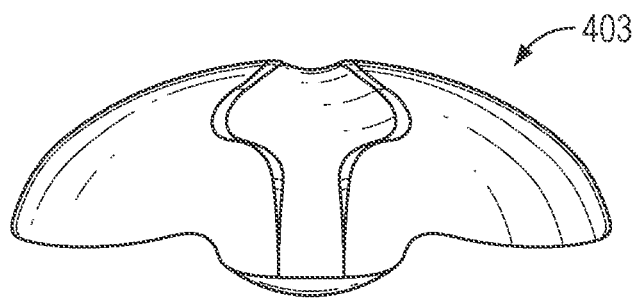
FIG. 26 is a front view of the bicycle saddle of FIG. 25.
Figure 27:
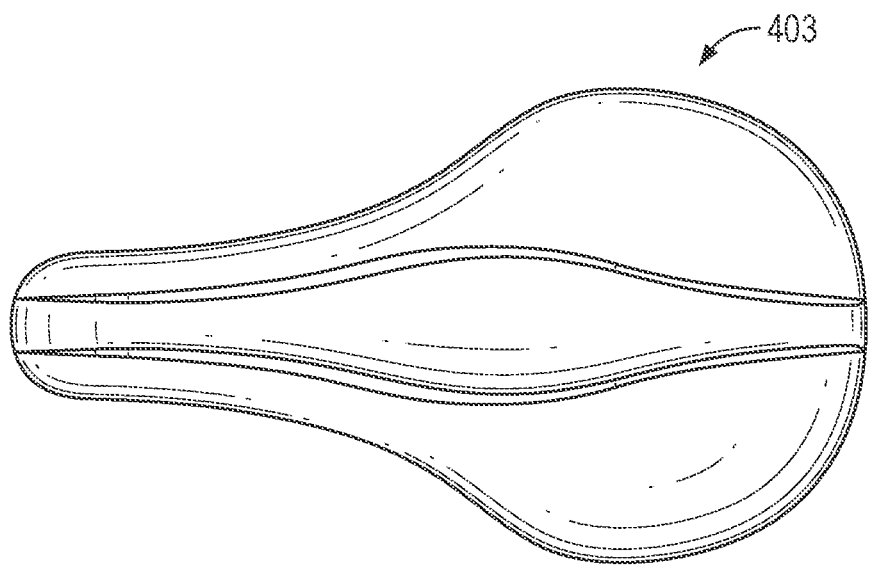
FIG. 27 is a top plan view of the bicycle saddle of FIG. 25.

FIG. 25 is an isometric view of a moldable seat saddle in accordance with an embodiment of the technology. FIG. 26 is a front view of the seat saddle 403. FIG. 27 is a top view of the seat saddle 403. The seat saddle 403 can be generally shorter than seat saddle 110 discussed in connection with FIGS. 1-19. A comparison of FIG. 25 to FIG. 12 shows the difference in the general shape of the saddles. The saddle 403 can include any number of moldable panels.

Figure 28:
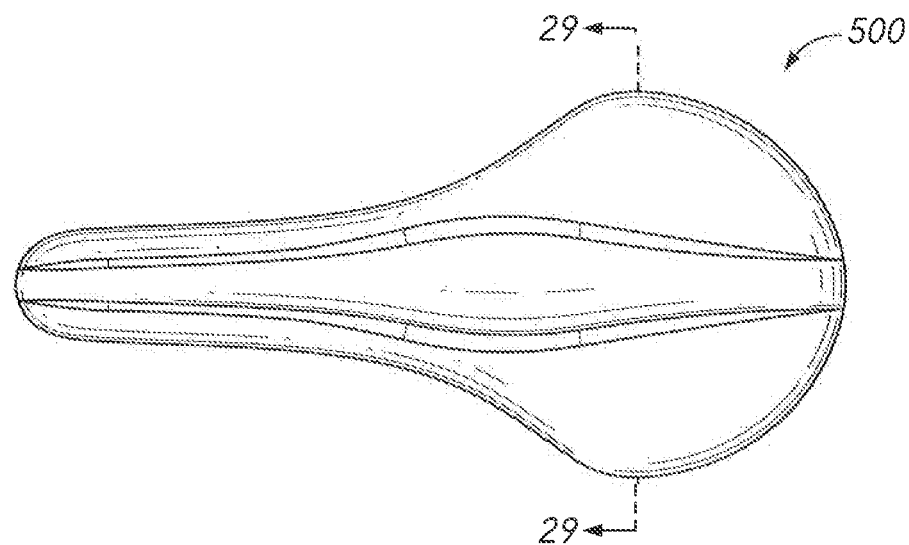
FIG. 28 is a top plan view of a saddle in accordance with an embodiment of the technology.
Figure 29:
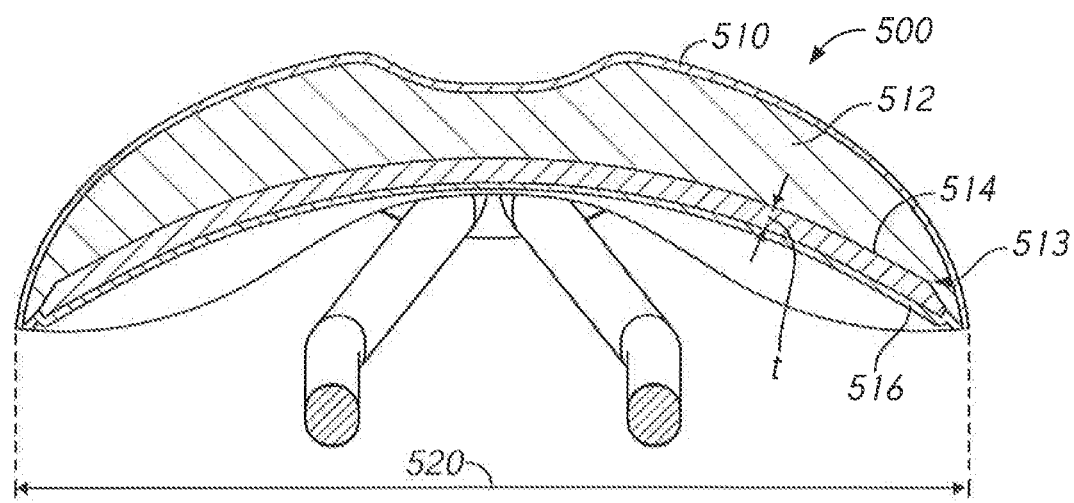
FIG. 29 is a cross-sectional view of the saddle taken along line 29-29 of FIG. 28 prior to performing a fitting process.

FIG. 28 is a top plan view of the saddle 500 in accordance with an embodiment of the technology. FIG. 29 is a cross-sectional view of the pre-molded saddle 500 taken along line 29-29 of FIG. 28. Referring to FIG. 29, the saddle 500 can include an outer layer 510, a cushioning element or layer 512, and a moldable support shell 513. The outer layer 510 can be a covering that overlays the cushioning element 512. The cushioning element 512 can be made, in whole or in part, of one or more cushioning materials, such as foam (e.g., open or closed-cell foam), padding, or combinations thereof. The moldable support shell 513 can include the moldable layer 514 and a rigid base shell or support structure 516 ("support structure 516"). The layer 514 can be positioned directly below the cushioning element 512 and supported by the support structure 516. The cushioning element 512 and/or support structure 516 may or may not be thermoformable itself.

The cushioning layer 514 can be a mono-layer or multi-layer and can be made, in whole or in part, of one or more compressible moldable materials. The layer 514 can have a thickness t between about 1 mm and about 5 mm, about 2 mm and about 3 mm, about 3 mm and about 4 mm, or other suitable uniform or varying thicknesses. In certain embodiments, the thickness t can be equal to, less than, or greater than about 1 mm, 2 mm, 3 mm, 4 mm, 5 mm, or 6 mm. The thickness t can be increased at regions directly beneath the sit bones to allow for significant compressibility at high pressure sites. In other embodiments, the thermoformable layer 514 can have a generally uniform thickness across the saddle width 520. This allows the saddle to be thermoformed to a wide range of different rider body geometries (e.g., female bodies, male bodies, etc.).

Figure 30:
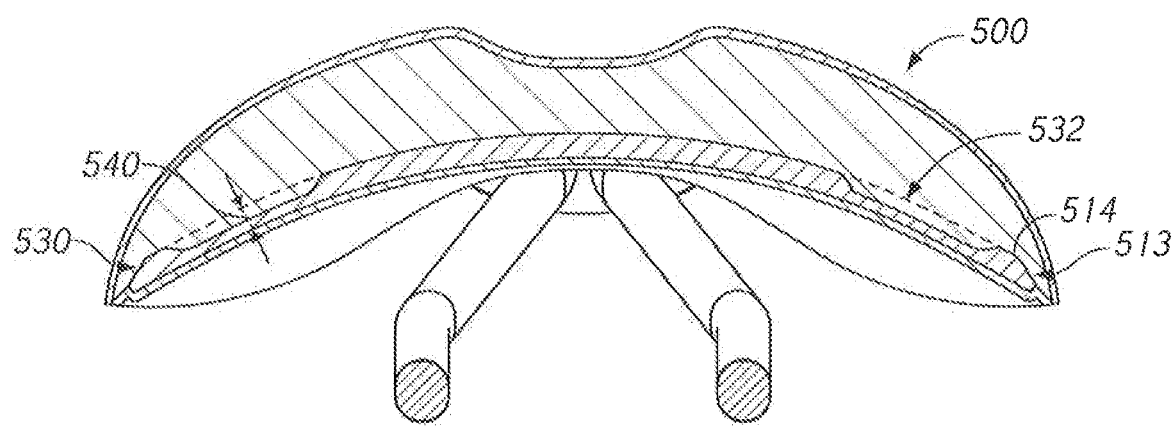
FIG. 30 is a cross-sectional view of the saddle taken along line 29-29 of FIG. 28 after completing the fitting process.

FIG. 30 shows the thermoformable layer 514 after it has been molded. Two regions 530, 532 of the layer 514 have been compressed a distance 540. The distance 540 can be between about 0.5 mm and about 1.5 mm, about 1 mm and about 3 mm, about 1 mm and about 5 mm, or other desired amounts. The distance of compression will vary based upon the thickness of the layer 514 and the user's weight. Each compressed area of the respective region 530, 532 can cover an area equal to, larger than, or smaller than 4 $cm^2$, 6 $cm^2$, 8 $cm^2$, 10 $cm^2$, 20 $cm^2$ 30 $cm^2$, 50 $cm^2$, or another suitable area. Additionally or alternatively, each compressed area of the respective region 530, 532 can cover an area equal to, larger than, or smaller than 20%, 30%, 40%, or 50% of the total seat area. The molded regions 530, 532 of FIG. 30 allow the rider's sit bones to preferentially sit directly above the regions 530, 532, thereby helping to distribute stresses or pressures to other parts of the saddle 500 and/or helping to position the rider's body with the saddle.

Although the cushion element 514 is illustrated as a single continuous layer across most of the width 520 of the saddle 500, the cushion element 514 can include a plurality of separate discrete thermoformable layers, panels, inserts, or the like. One thermoformable layer can be positioned on one side of the saddle 500 and another thermoformable layer 514 can be positioned on the other side of the saddle.

Figure 31:
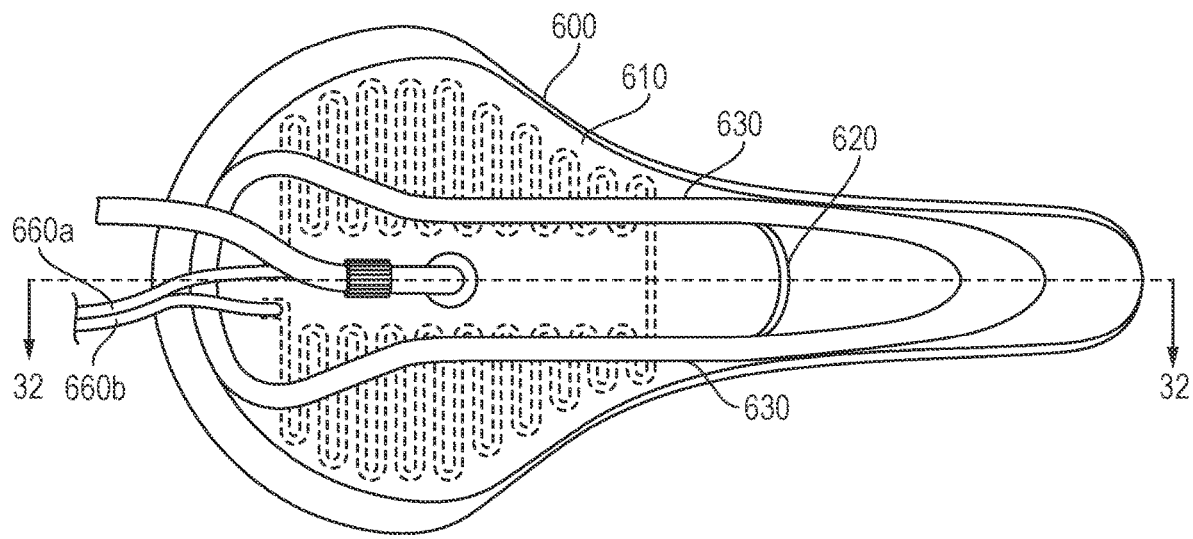
FIG. 31 is a bottom view of a bicycle saddle and an external heater in accordance with an embodiment of the technology.
Figure 32:
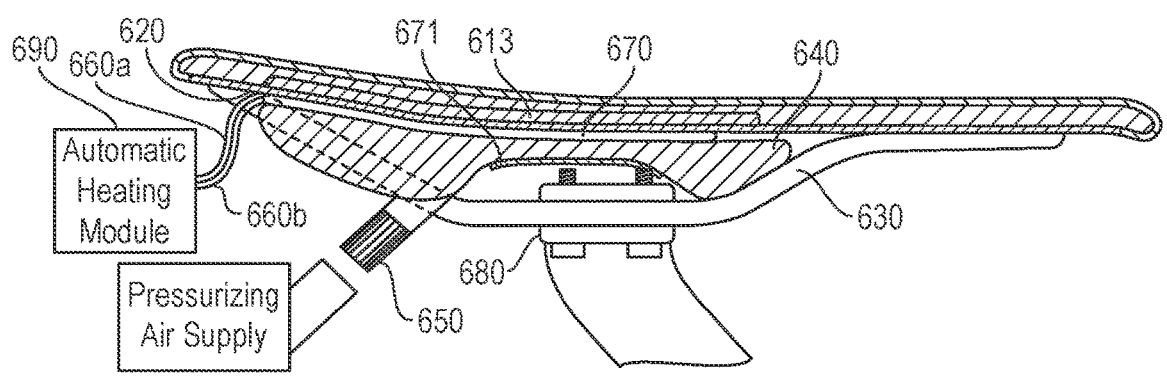
FIG. 32 is a cross-sectional view of the saddle and external heater taken along line 32-32 of FIG. 31.

FIG. 31 is a bottom view of a saddle 600 and an external heater assembly 610 in accordance with embodiment of the technology. FIG. 32 is a cross-sectional view of the saddle 600 and heater assembly 610 taken along line 32-32 of FIG. 31. The heater 610 generates thermal energy to heat moldable regions of the bicycle saddle 600. A rider can be supported by the bicycle saddle 600 to mold the heated thermoformable regions to the rider. After molding the saddle 600, the support provided by the molded saddle can be analyzed by the automatic heating module 690 (FIG. 32), the rider, technician, or the like. The saddle can be remolded any number of times to achieve a desired fit. After an evaluation indicates that the molded saddle 600 provides the desired support to the rider, the external heater 610 can be removed from the molded bicycle saddle 600, thereby avoiding increasing the weight of the saddle 600 permanently.

Referring now to FIGS. 31 and 32 together, the thermoformable saddle 600 is in thermal contact with an external heater 610. The external heater assembly 610 can be configured to be removably coupled to the bicycle saddle 600 such that the heater assembly is in thermal contact with thermoformable region(s) 613 (FIG. 32) of the saddle. The heater assembly 610 can further include connectors 660a, 660b that power one or more thermal elements.

The heater assembly 610 is installed between a support shell 620 and rails 630. The heater assembly 610 can include a deployable body 640 configured to be expanded to press against the rails 630 and the shell 620. The body 640 can be in the form of an inflatable bladder configured to receive fluid (e.g., air, gas, etc.), or a compressible/expandable object such as a sponge or mechanically expandable object. An inflation stem or valve 650 can be used to inflate the body 640 and can be a Schrader valve, Presta valve, or other suitable valve or stem. In Schrader valve embodiments, a conventional bike pump can be used to inflate the body 640.

A controller or automatic heating module 690 can be connected to the heating elements via the connectors 660a, 660b. The automatic heating module 690 and the pressurized air supply can be integrated together or separate components. In other embodiments, the heating module 690 and the pressurized air supply are separate components. The description of the controllers disclosed herein applies equally to the automatic heating module 690. The automatic heating module 690 can include external heating programs with instructions for operating heaters. The module 690 can also be in communication (e.g., wireless or wired connection) with one or more sensors, such as standalone sensors, sensors incorporated into the heater and/or the saddle, or the like. In addressable heater embodiments, the module 690 can command different regions of the heater to provide for non-uniform heating across the saddle. In non-addressable heater embodiments, the module 690 can control the heater to provide for general uniform heating across the region of the saddle in thermal contact with the heater assembly 610. The automatic heating module 690 and/or pressurized air supply can be powered by a corded NC source or by an internal power supply (e.g., a rechargeable D/C battery system) for untethered use. The pressurized air supply can be controlled (e.g., via a controller or computer) to keep the bladder at a target pressure or within a range of pressures to achieve desired thermal contact. The configuration of the body 640 can be selected based on the configuration of the shell 620 and the support structure to which the saddle 600 is attached.

Figure 33:
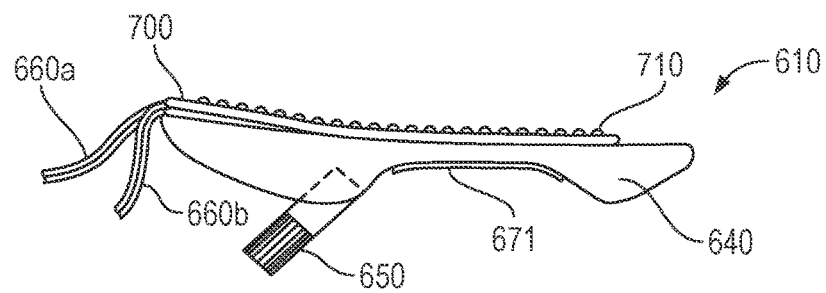
FIG. 33 is a side view of an external heater in accordance with an embodiment of the technology.

FIG. 33 is a side view of the heater assembly 610 in accordance with an embodiment of the technology. The heater assembly 610 can include a laminated heater 700 with one or more thermal elements 710 (one identified in FIG. 33) positioned to be placed in thermal contact with the saddle. The heating elements 710 can be positioned along the upper region of the body 640. In some embodiments, the connector 660a can include thermocouple or thermistor wires, and the connector 660a can include heater wires. In selectively addressable heater embodiments, the connector 660a can include multiple sets of thermostat wires and the connector 660b can include multiple sets of electrical wires. A central region 670 of the body 640 can have a reduced profile or relief to accommodate mounting clamps 680.

The thermoformable saddle 600 can include a protection element 671 (FIGS. 32 and 33) facing the mounting clamp 680. The protection element 671 can be a flexible reinforcement laminated panel that may contact the mounting clamp 680, including the mounting bolts. The protection element 671 can prevent damage (e.g., puncture) of the bladder when the bladder is inflated.

In operation, the inflatable heater 610 in a deflated configuration can be positioned underneath the saddle 600. Once positioned, the body 640 is configured to be inflated by delivering air via the valve 650. As the body 640 inflates, it can push the heater 700 (FIG. 33) against the shell 620 of the saddle 600. In automated embodiments, the pressurized air supply can automatically inflate the body 640 to a desired level. The automated inflation can be employed to avoid user interaction and potential user error.

The body 640 can be configured to provide desired registration with the saddle. The front registration (FIG. 31) can be achieved via a wedged front region of the body 640 pinched between the rails 630 and the shell. Rear registration (FIG. 31) can be achieved by a rearward section of the main body 640 pressing against rearward regions of the rails 630 and/or lip of the saddle 620. The front and rear registration can inhibit, limit, or substantially prevent forward and/or rearward movement of the heater assembly 610 relative to the saddle.

To evaluate support provided by the saddle, pre-molded data can be collected, including pre-molded seat pressure data, pressure distribution data, or the like. Post-molded data can be collected and compared to the pre-molded data to determine whether the molded saddle provides desired support. Sensor measurements and/or the rider's feedback can be used to determine whether to remold the saddle 600. In some embodiments, for example, the shell 620 has customizable tuberosity panels that can be in thermal contact with the heater 700. The heater 700 can generate sufficient thermal energy to heat the tuberosity panels above a predetermined temperature. The heater 700 overlays an upper region of the deployable body 640 and, in some embodiments, extends across most of the width of the body 640, as shown in FIG. 31. This allows most of the width of the saddle to be thermoformed.

Heaters, saddles, and methods disclosed herein can be used with the technologies disclosed in U.S. patent application Ser. No. 16/358,600, International Application No. PCT/IB2018/001482, and U.S. Provisional Patent Application No. 62/560,095. The thermoformable shells disclosed herein and in U.S. patent application Ser. No. 16/358,600, International Application No. PCT/IB2018/001482, and U.S. Provisional Patent Application No. 62/560,095 can be molded without causing thermoforming of the overlying cushioning material. This allows the support structure to be molded without noticeably affecting cushioning characteristics of the saddle. To limit or prevent thermoforming of the cushioning material, the softening or molding temperature of a cushioning material can be substantially higher than that of the shell. Throughout the molding process, the characteristics of the cushioning material can be substantially unaffected due to the thermoforming process. In other embodiments, both the shell and the cushioning material can be thermoformed. This allows for a high degree of thermoforming. To thermoform both in the same procedure, the cushioning material and the shell can have substantially the same softening temperature, glass transition temperature, or melt temperature. Both the cushioning material and the shell can be molded together without disassembling the saddle. This allows the cushioning material to be permanently coupled to the shell via, for example, adhesive, glue, mechanical fasteners, combinations thereof, or the like. The disclosure of all the foregoing applications (e.g., U.S. patent application Ser. No. 16/358,600, International Application No. PCT/IB2018/001482, and U.S. Provisional Patent Application No. 62/560,095) are incorporated herein by reference in their entireties.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A customizable bicycle saddle comprising:
   padding; and
   a support assembly located underneath the padding and configured to support a rider, the support assembly including
      a support shell including an opening,
      a customizable panel covering the opening, and
      at least one internal thermal element that is configured to heat at least a portion of the customizable panel covering the opening to mold the heated portion of the customizable panel to the rider's anatomy, wherein the molded portion of the customizable panel is configured to maintain its shape during use.

2. The customizable bicycle saddle of claim 1, wherein the at least one internal thermal element is configured to heat the portion of the customizable panel subjected to relatively high applied pressures to a predetermined temperature, wherein the predetermined temperature is at least one of a softening temperature, a glass transition temperature, or a melt temperature of the at least the portion.

3. The customizable bicycle saddle of claim 1, wherein the opening is positioned below an ischial tuberosity bone supporting region of the customizable panel.

4. The customizable bicycle saddle of claim 1, wherein the customizable panel includes first and second ischial tuberosity bone supporting portions located under the at least one internal thermal element.

5. The customizable bicycle saddle of claim 1, wherein the customizable panel includes a thermoplastic body in thermal contact with the at least one internal thermal element positioned to be under the rider's sit bones.

6. The customizable bicycle saddle of claim 1, wherein the support shell is configured to maintain its shape during molding of the customizable panel.

7. The customizable bicycle saddle of claim 1, wherein the at least one internal thermal element is permanently embedded in the customizable bicycle saddle and capable of selectively heating the customizable panel while the rider is supported by the customizable bicycle saddle.

8. The customizable bicycle saddle of claim 1, wherein the customizable panel is configured to retain its molded shape when at room-temperature and is configured to be remolded when heated above a predetermined temperature.

9. A bicycle saddle comprising:
   a support shell including at least one receiving feature;
   a heater is removably coupled to the bicycle saddle; and
   a moldable panel being thermoformable when heated by the heater to accommodate a subject's anatomy to reduce high pressures when the subject sits on the bicycle saddle, wherein the thermoformed moldable panel maintains its shape when the subject sits on the bicycle saddle.

10. The bicycle saddle of claim 9, wherein the heater is an externally powered.

11. A method for fitting a bicycle saddle, the method comprising:
   coupling a bicycle saddle to a power source;
   heating the bicycle saddle using a heater assembly thermally coupled to a moldable portion of the bicycle saddle, wherein the heater assembly is configured to be separated from the bicycle saddle; and
   molding the heated bicycle saddle to the rider while the rider is supported by the bicycle saddle, wherein the molded portion of the bicycle saddle maintains its shape when the subject sits on the bicycle saddle.

12. The method of claim 11, further comprising determining whether to remold the bicycle saddle based on one or more or sensor measurements and/or the rider's feedback.

13. The method of claim 11, wherein after molding the bicycle saddle, sensing a pressure applied by the rider to the bicycle saddle.

14. The method of claim 11, wherein molding the heated bicycle saddle includes molding heated inserts of the bicycle saddle to the rider performing different activities while being supported by the bicycle saddle.

15. The method of claim 11, further comprising:
   obtaining one or more sensor readings associated with the rider on the bicycle saddle; and
   modifying the fitting of bicycle saddle process based on the obtained one or more readings.

16. A customizable bicycle saddle comprising:
   padding;
   a support assembly located under the padding and including
      a support structure including an opening, and
      a customizable thermoformable panel covering at least a portion of the opening and configured to be heated for molding a heated portion of the customizable panel to the rider's anatomy, wherein the molded portion of the customizable thermoformable panel is configured to maintain its shape during use by the rider; and
   a temperature detector coupled to the support assembly and configured to detect a temperature of the heated portion of the customizable panel.

17. The customizable bicycle saddle of claim 16, wherein the temperature detector is positioned to detect the temperature of the heated portion while the customizable thermoformable panel is heated by an external heating source.

18. The customizable bicycle saddle of claim 17, wherein the external heating source is a forced convection heater, a hot air gun, or a hair dryer.

19. The customizable bicycle saddle of claim 16, wherein the temperature detector is positioned on an underside of the saddle.

20. The customizable bicycle saddle of claim 16, wherein the temperature detector is positioned inside the bicycle saddle.

21. The customizable bicycle saddle of claim 16, wherein at least a portion of the customizable bicycle saddle is made of a composite material including fibers.

22. The customizable bicycle saddle of claim 16, wherein the temperature detector is positioned at a sit bone supporting area of the customizable thermoformable panel.

* * * * *